(12) United States Patent
Shan

(10) Patent No.: US 10,638,449 B2
(45) Date of Patent: Apr. 28, 2020

(54) SYSTEMS AND METHODS USING A CENTRALIZED NODE TO COLLECT RAN USER PLANE CONGESTION INFORMATION

(71) Applicant: Chang Hong Shan, Shanghai (CN)

(72) Inventor: Chang Hong Shan, Shanghai (CN)

(73) Assignee: Apple Inc., Cupertino, CA (US)

( * ) Notice: Subject to any disclaimer, the term of this patent is extended or adjusted under 35 U.S.C. 154(b) by 376 days.

(21) Appl. No.: 14/771,859

(22) PCT Filed: Mar. 28, 2014

(86) PCT No.: PCT/US2014/032227
§ 371 (c)(1),
(2) Date: Sep. 1, 2015

(87) PCT Pub. No.: WO2014/175997
PCT Pub. Date: Oct. 30, 2014

(65) Prior Publication Data
US 2016/0029247 A1    Jan. 28, 2016

Related U.S. Application Data

(60) Provisional application No. 61/816,662, filed on Apr. 26, 2013.

(51) Int. Cl.
*H04W 28/02* (2009.01)
*H04W 8/22* (2009.01)
(Continued)

(52) U.S. Cl.
CPC ............ *H04W 68/02* (2013.01); *H04J 11/00* (2013.01); *H04J 11/005* (2013.01);
(Continued)

(58) Field of Classification Search
CPC ........................... H04W 28/0289; H04W 8/22
See application file for complete search history.

(56) References Cited

U.S. PATENT DOCUMENTS 6,253,146 B1   6/2001   Hanson et al.
6,831,895 B1  12/2004   Ji et al.
(Continued)

FOREIGN PATENT DOCUMENTS

EP    1965579 B1   12/2007
EP    2512176 A1   10/2012
(Continued)

OTHER PUBLICATIONS

PCT/US2014/032227, International Search Report and Written Opinion, dated Aug. 5, 2014, 3 pages.

*Primary Examiner* — Derrick W Ferris
*Assistant Examiner* — Farhad Ali
(74) *Attorney, Agent, or Firm* — Kowert, Hood, Munyon, Rankin & Goetzel, P.C.

(57) ABSTRACT

A centralized node collects and stores radio access network (RAN) user plane congestion information (RCI) that is reported from the RAN to a core network. The centralized node provides a congestion information collection function (CICF) and includes one or more interface to communicate with a mobility management entity (MME) and/or a serving general packet radio service (GPRS) support node (SGSN). The MME and/or SGSN allows the centralized node to determine user equipments (UEs) and associated access point name (APNs) impacted by RAN congestion. The centralized node reports the RCI to a policy and charging rules function (PCRF) associated with the APNs for congestion mitigation.

26 Claims, 12 Drawing Sheets

(51) Int. Cl.
| | |
|---|---|
| H04W 68/02 | (2009.01) |
| H04N 7/14 | (2006.01) |
| H04W 76/14 | (2018.01) |
| H04W 4/70 | (2018.01) |
| H04W 76/27 | (2018.01) |
| H04W 76/28 | (2018.01) |
| H04L 1/16 | (2006.01) |
| H04W 52/08 | (2009.01) |
| H04L 5/00 | (2006.01) |
| H04J 11/00 | (2006.01) |
| H04L 29/06 | (2006.01) |
| H04W 72/04 | (2009.01) |
| H04W 52/02 | (2009.01) |
| H04W 8/00 | (2009.01) |
| H04W 88/02 | (2009.01) |
| H04W 36/00 | (2009.01) |
| H04W 60/00 | (2009.01) |
| H04W 24/06 | (2009.01) |
| H04W 72/12 | (2009.01) |
| H04W 48/18 | (2009.01) |
| H04L 12/14 | (2006.01) |
| H04L 29/08 | (2006.01) |
| H04L 1/18 | (2006.01) |
| H04W 52/32 | (2009.01) |
| H04N 7/15 | (2006.01) |
| H04W 68/00 | (2009.01) |
| H04L 12/26 | (2006.01) |
| H04L 12/801 | (2013.01) |
| H04W 48/06 | (2009.01) |
| H04W 76/18 | (2018.01) |
| H04W 76/38 | (2018.01) |
| H04W 72/14 | (2009.01) |
| H04W 52/14 | (2009.01) |
| H04W 52/24 | (2009.01) |
| H04W 88/06 | (2009.01) |
| H04N 21/4728 | (2011.01) |
| H04N 21/4788 | (2011.01) |
| H04N 21/6437 | (2011.01) |

(52) U.S. Cl.
CPC ........ *H04J 11/0023* (2013.01); *H04L 1/1671* (2013.01); *H04L 1/1812* (2013.01); *H04L 5/005* (2013.01); *H04L 5/0007* (2013.01); *H04L 5/0032* (2013.01); *H04L 5/0033* (2013.01); *H04L 5/0073* (2013.01); *H04L 12/1407* (2013.01); *H04L 29/06068* (2013.01); *H04L 43/16* (2013.01); *H04L 47/12* (2013.01); *H04L 65/105* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04L 67/02* (2013.01); *H04L 67/10* (2013.01); *H04L 69/08* (2013.01); *H04N 7/141* (2013.01); *H04N 7/147* (2013.01); *H04N 7/15* (2013.01); *H04W 4/70* (2018.02); *H04W 8/005* (2013.01); *H04W 8/22* (2013.01); *H04W 24/06* (2013.01); *H04W 28/0236* (2013.01); *H04W 28/0289* (2013.01); *H04W 36/0066* (2013.01); *H04W 48/18* (2013.01); *H04W 52/0212* (2013.01); *H04W 52/0216* (2013.01); *H04W 52/08* (2013.01); *H04W 52/32* (2013.01); *H04W 60/00* (2013.01); *H04W 68/00* (2013.01); *H04W 72/0446* (2013.01); *H04W 72/0486* (2013.01); *H04W 72/1231* (2013.01); *H04W 72/1278* (2013.01); *H04W 76/14* (2018.02); *H04W 76/27* (2018.02); *H04W 76/28* (2018.02); *H04W 88/02* (2013.01); *H04L 1/1861* (2013.01); *H04L 5/0044* (2013.01); *H04L 5/0055* (2013.01); *H04L 47/10* (2013.01); *H04N 21/4728* (2013.01); *H04N 21/4788* (2013.01); *H04N 21/6437* (2013.01); *H04W 48/06* (2013.01); *H04W 52/146* (2013.01); *H04W 52/242* (2013.01); *H04W 52/325* (2013.01); *H04W 72/04* (2013.01); *H04W 72/042* (2013.01); *H04W 72/044* (2013.01); *H04W 72/0413* (2013.01); *H04W 72/0453* (2013.01); *H04W 72/1284* (2013.01); *H04W 72/1289* (2013.01); *H04W 72/14* (2013.01); *H04W 76/18* (2018.02); *H04W 76/38* (2018.02); *H04W 88/06* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/23* (2018.01); *Y02D 70/24* (2018.01); *Y02D 70/26* (2018.01)

(56) References Cited

U.S. PATENT DOCUMENTS

| | | |
|---|---|---|
| 2001/0043565 A1 | 11/2001 | Chen et al. |
| 2004/0264377 A1 | 12/2004 | Kilkki et al. |
| 2011/0255410 A1 | 10/2011 | Yamen et al. |
| 2011/0317660 A1 | 12/2011 | Jin |
| 2013/0258865 A1* | 10/2013 | Kovvali ............... H04W 24/10 370/241 |
| 2014/0086052 A1* | 3/2014 | Cai ....................... H04L 47/748 370/235 |
| 2016/0112896 A1* | 4/2016 | Karampatsis ..... H04W 28/0252 370/230.1 |
| 2016/0134464 A1* | 5/2016 | Centonza .......... H04W 28/0247 370/236 |

FOREIGN PATENT DOCUMENTS

| | | | |
|---|---|---|---|
| EP | 2819455 A1 * | 12/2014 | ........ H04W 28/0289 |
| KR | 1020120052907 A | 5/2012 | |
| WO | 2011069422 A1 | 6/2011 | |

* cited by examiner

US 10,638,449 B2

SYSTEMS AND METHODS USING A CENTRALIZED NODE TO COLLECT RAN USER PLANE CONGESTION INFORMATION

RELATED APPLICATIONS

This application claims the benefit under 35 U.S.C. § 119(e) of U.S. Provisional Application No. 61/816,662, filed Apr. 26, 2013 which is hereby incorporated by reference herein in its entirety.

TECHNICAL FIELD

The present disclosure relates to wireless communication systems. More particularly, the present disclosure relates to radio access network user plane congestion awareness.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE), global system for mobile communications (GSM), and enhanced data rates for GSM (EDGE) standards. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Mobile operators are seeing significant increases in user data traffic. For some operators, user data traffic has more than doubled annually for several years. Although the data capacity of networks has increased significantly, the observed increase in user traffic continues to outpace the growth in capacity. This is resulting in increased network congestion and in degraded user service experience.

RAN user plane congestion occurs when the demand for RAN resources exceeds the available RAN capacity to deliver the user data for a period of time. RAN user plane congestion leads, for example, to packet drops or delays, and may or may not result in degraded end-user experience. Short-duration traffic bursts are normal conditions at any traffic load level, and generally are not considered to be RAN user plane congestion. Likewise, a high-level of utilization of RAN resources (based on operator configuration) is generally considered a normal mode of operation and might not be RAN user plane congestion. Further, RAN user plane congestion includes user plane congestion that occurs over air interface (e.g., LTE-Uu interfaces), in the radio node (e.g., eNB), and/or over the back haul interface between the RAN and the core network (e.g., S1-u interface).

I. Overview of Ran User Plane Congestion Information

Figure 1:
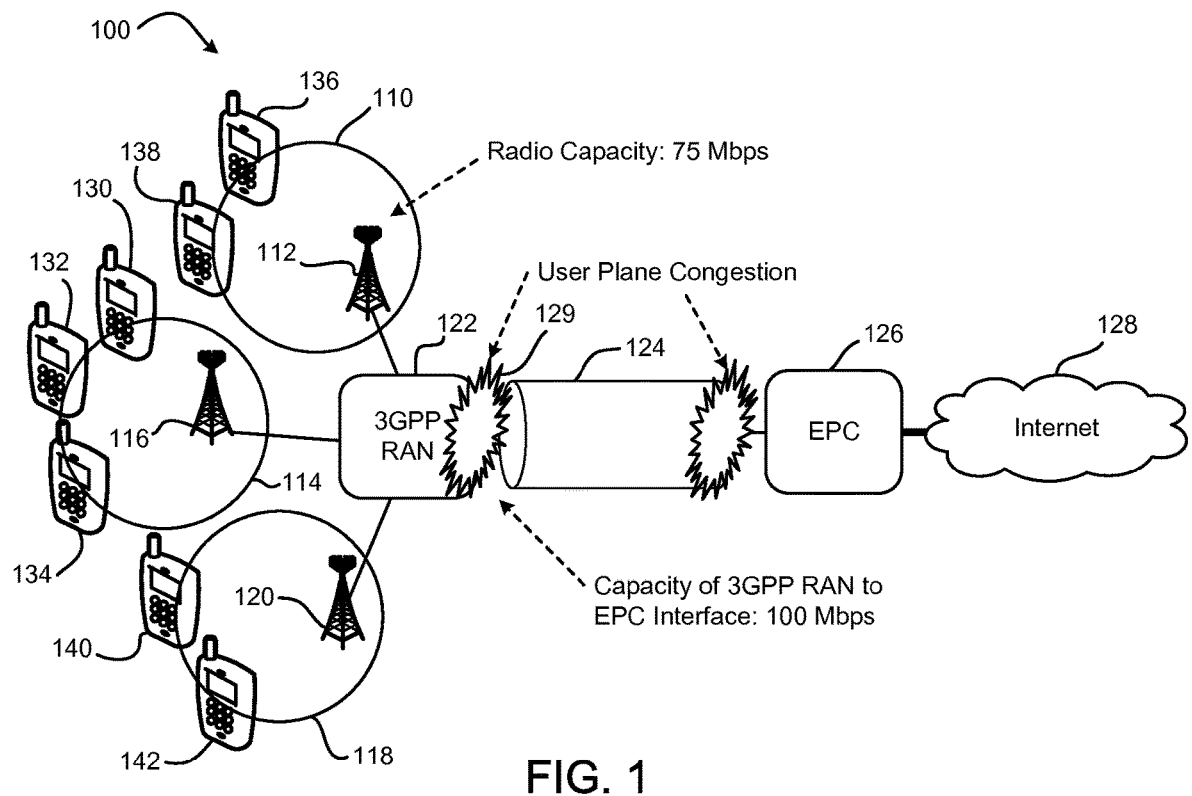
FIG. 1 is a block diagram illustrating example radio access network (RAN) user plane congestion in a wireless communication system.

FIG. 1 is a block diagram illustrating example RAN user plane congestion in a 3GPP system 100. The system 100 includes a first cell 110 served by a first eNodeB 112, a second cell 114 served by a second eNodeB 116, and a third cell 118 served by a third eNodeB 120. The cells 110, 114, 118 communicate user data through a 3GPP RAN 122, backhaul interface 124, evolved packet core (EPC or "core network") 126, and the internet 128 or other network. In this example, the cells 110, 114, 118 each have a radio capacity of 75 Mbps and the backhaul interface 124 between the RAN 122 and the EPC 126 has a capacity of 100 Mbps. In one example scenario, user plane congestion occurs when the traffic volume exceeds the capacity of a cell. User plane congestion 129 occurs in the second cell 114, for example, when UEs 130, 132 in the second cell 114 are generating user plane traffic totaling the cell capacity, and then an additional or an existing UE 134 attempts to generate additional user plane traffic.

By way of another example, user plane congestion 136 may also occur when the user plane data volume of the UEs 130, 132, 134, 136, 138, 140, 142 being served by the cells 110, 114, 118 totals more than the actual capacity of the interface 124 between the RAN 122 and the EPC 126. Such user plane congestion 136 may limit the performance of each of the UEs 130, 132, 134, 136, 138, 140, 142 involved. This may lead to excessive data rate reduction or service denial. Even though each cell 110, 114, 118 may have the necessary capacity to support the respective UEs 130, 132, 134, 136, 138, 140, 142 it is serving, the capacity of the backhaul interface 124 has an impact on each UE 130, 132, 134, 136, 138, 140, 142 and may in the worst case actually prevent one or more of the UEs 130, 132, 134, 136, 138, 140, 142 from being offered any capacity at all.

Thus, in certain embodiments, the system 100 attempts to mitigate RAN user plane congestion to overcome or lessen the negative impact on the perceived service quality for data traffic. Congestion mitigation may include, for example, traffic prioritization, traffic reduction, and/or traffic limitation (e.g., throttling). Depending on an operator's mitigation policies, different congestion mitigation measures may be selected based on the user's subscription class, the type of application, and/or the type of content. To provide congestion mitigation, certain network elements outside the RAN 122 may need to become aware of the congestion status.

In certain embodiments disclosed herein, the RAN 122 (and/or one or more other network element) determines a congestion level using RAN measurements based on monitoring RAN resources. RAN user plane congestion information (RUCI or simply RCI) indicates the congestion level from the RAN 122 to the core network 126. RCI may indicate the level of congestion by, for example, a scalar value. RCI may, in some embodiments, include other information such as the location of the congested RAN (e.g., the RCI may include a cell identifier (ID) corresponding the RAN 122 or a particular cell of the RAN 122).

In addition, or in other embodiments, the RCI may include one or more of the following information elements: a congested interface element indicating whether the congestion is in the radio interface (e.g., LTE-Uu, Uu) or in the network interface (e.g., Gb, Iu-PS, S1-U); a congestion severity level element including a predefined number indicating the level (e.g., 0 to 7, where a smaller value means more severe, or vice-versa); a congestion situation element that indicates whether there currently is congestion (e.g., a value of 0 indicates no congestion and a value of 1 indicates congestion); for cell-based user plane congestion notification, a cell ID element; for UE-based user plane congestion notification, a UE ID element; for APN-based user plane congestion notification, an access point name (APN) element; and/or for packet data protocol (PDP) context or evolved packet system (EPS) bearer based user plane congestion notification, a relative ID element.

In various embodiments, RCI can be transferred to the core network via the user plane (e.g., extending the GTP-U extension header), the control plane (e.g., S1-MME, S11, S5/S8, Gx, Rx interfaces, or other signaling interfaces), or the network management plane (e.g., the operations and maintenance (O&M) system, the access network discovery and selection function (ANDSF), or other server or management plane element). Regardless of whether the RCI is transferred via the user plane, the control plane, or the network management plane, a policy and charging rules function (PCRF) within the core network may provide policies for congestion mitigation. However, core network elements, such as the gateway general packet radio service (GPRS) support node (GGSN) or the packet data network (PDN) gateway (P-GW), are not designed to store the RCI, which may be stateful. Further, in roaming cases, the number of eNodeBs that have indirect user plane or control plane interfaces may be very large. It may be very difficult for the GGSN or P-GW to store this large amount of information in addition to performing its regular routing functionality.

II. Centralized Node for Reporting RCI to the Core Network

In certain embodiments, a centralized node terminates RCI reporting from the RAN to the core network. The centralized node may be a logical function entity, and may be referred to herein as either a RAN congestion awareness function (RCAF) or a congestion information collection function (CICF). Regardless of whether the centralized node is referred to as RCAF or CICF, the centralized node uses the reported RCI to coordinate the rules so that the PCRF applies the same adjusted quality of service (QoS) on the same QoS class identifier (QCI) across different APNs using different P-GWs. As discussed below, the RCAF or CICF collects RCI, stores the RCI for a period of time, discovers the proper PCRF for an impacted UE, and queries for and receives a list of UEs and related APNs for each UE connected to a given eNodeB experiencing user plane congestion. The RCAF or CICF communicates with PCRFs serving the impacted UEs for RAN user plane congestion information reporting.

A. Example Architectures

Figure 2:
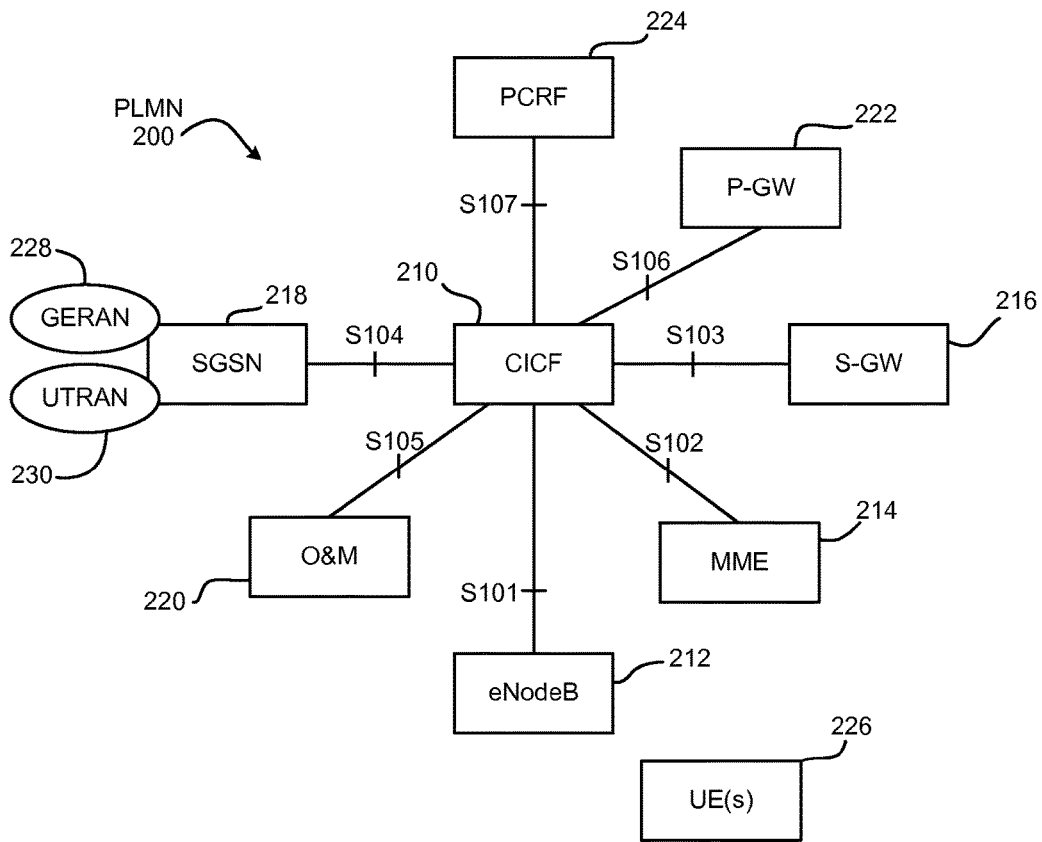
FIG. 2 is a block diagram of a non-roaming architecture including a centralized node according to one embodiment.

FIG. 2 is a block diagram of a non-roaming architecture for E-UTRAN including a centralized node 210 according to one embodiment. In this example, and in other examples discussed herein, the centralized node 210 is referred to as CICF 210. However, as discussed above, the term RCAF may also be applied to the centralized node 210. The CICF 210 may be a standalone function or may be collocated with other network elements within a public land mobile network (PLMN) 200. The PLMN 200 includes an interface S101 between the CICF 210 and an eNodeB 212, an interface S102 between the CICF 210 and a mobility management entity (MME) 214, an interface S103 between the CICF 210 and a serving gateway (S-GW) 216, an interface S104 between the CICF 210 and a serving GPRS support node (SGSN) 218, an interface S105 between the CICF 210 and an O&M system 220, an interface S106 between the CICF 210 and a P-GW 222, and an interface S107 between the CICF 210 and a PCRF 224. The interfaces S101, S102, S103, S104, S105, S106, S107 may also be referred to herein as references points. The eNodeB 212 is in wireless communication with one or more UEs 226. The SGSN 218 may provide core network access to a GSM EDGE radio access network (GERAN) 228 and/or a UTRAN 230.

The CICF 210 collects and stores RCI. Based on the stored RCI, according to certain embodiments, the CICF 210 triggers the PCRF 224 to modify an internet protocol connectivity access network (IP-CAN) session. The PCRF 224 may then provide policies for congestion mitigation.

In one embodiment, the CICF 210 collects raw user plane congestion information from the O&M 220 through the interface S105. The O&M 220 may correspond to operation support system (OSS) level features of the RAN operator (the O&M 220 is not assumed to be within the eNodeB or RNC). The CICF 210 determines the list of UEs 226 impacted by the user plane congestion. The CICF 210 may also integrate the RAN congestion status with an integration time fitting with core mitigation tools (e.g., to provide the PCRF 224 only with information on sustained congestion). In addition, or in other embodiments, the CICF 210 also provides "spatial" integration of the RAN congestion information (due to mobility and to one of more of the UEs 226 possibly being served by multiple cells, the RCI associated with a cell may depend on the congestion status in the neighboring cells).

The CICF 210 sends the RCI over the interface S107 between the CICF 210 and the PCRF 224. Over the interface S102, the MME 214 provides the CICF 120 with a list of impacted UEs 226 (e.g., a list of international mobile subscriber identities (IMSIs) associated with the UEs 226) in a given eNodeB ID or E-UTRAN cell global identifier (ECGI). For each of the IMSIs in the list, the SGSN sends the APNs of the active PDN connections. The interface S104 between the CICF 210 and the SGSN 218 is used, for a set of IMSIs, to provide the CICF 210 with the list of APNs of the active PDN connections of each of these IMSIs. In certain embodiments, no congestion information is sent over the interface S102 or the interface S104.

In certain embodiments, the RCI is defined over the interface S107 and includes congestion and/or abatement location information (e.g., eNodeB ID, cell ID, or 3G service area ID). The congestion location information may provide an indication of the congested interface direction and node including, for example, radio interface downlink information (e.g., LTE-Uu, Uu), radio interface uplink information, network interface downlink information (e.g., Gb, Iu-PS, S1-U), network interface uplink information, and/or RAN node information (e.g., eNodeB, RNC, and/or base station subsystem (BSS) information).

The RCI defined over the interface S107 also includes congestion level information (e.g., a congestion severity level based on a scale of 0-7, or 0-10, or some other scale), and/or congestion situation information indicating the existence of congestion (e.g., a value of 0 indicating congestion disappears, and a value of 1 indicating congestion appears). The RCI may also include a validity time associated with the congestion information. When the validity time elapses and no further congestion information has been received, for example, the congestion is assumed to be over. In addition, or in other embodiments, the RCI includes a UE identifier (e.g., international mobile equipment identity (IMEI)), a user identity (e.g., IMSI), an APN, and/or a PDP context or EPS bearer ID.

Figure 3A:
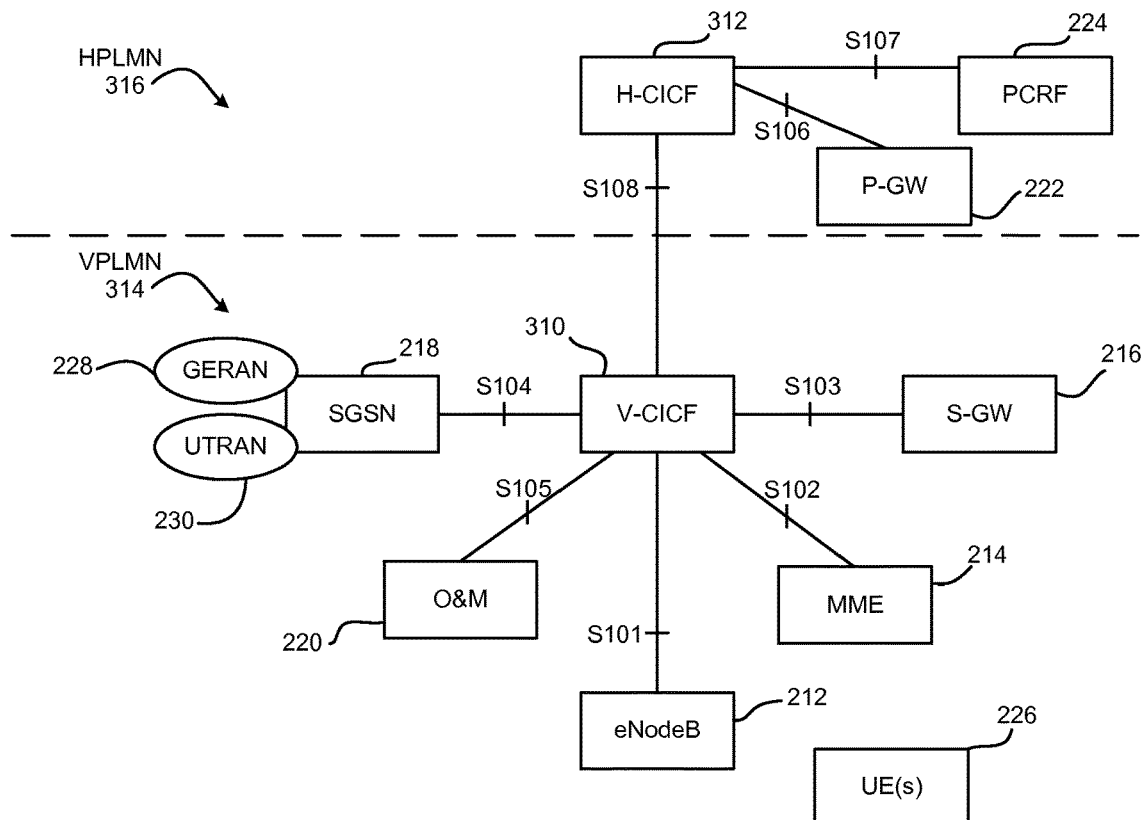
FIGS. 3A and 3B are block diagrams of roaming architectures including centralized nodes according to certain embodiments.
Figure 3B:
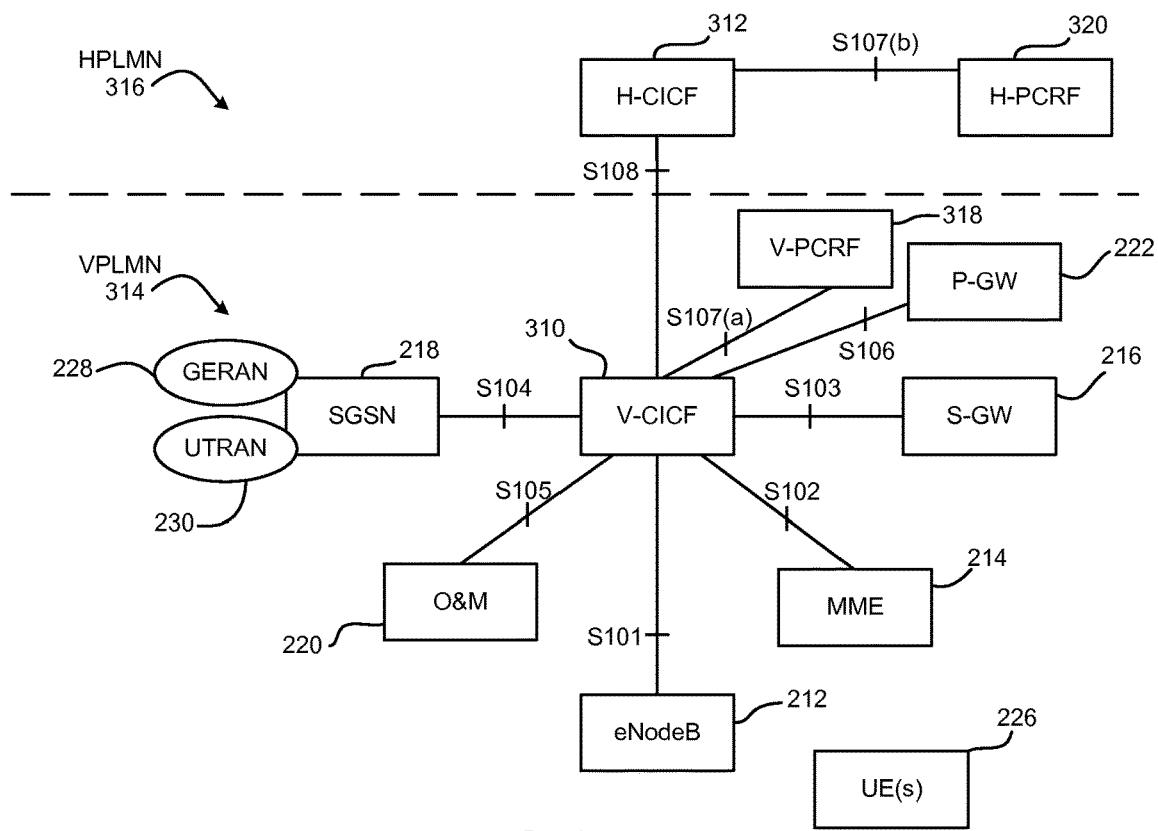

FIGS. 3A and 3B are block diagrams of roaming architectures for E-UTRAN including a visited centralized node (V-CICF) 310 and a home centralized node (H-CICF) 312 according to certain embodiments. The V-CICF 310 is in a visited PLMN (VPLMN) 314 and the H-CICF 312 is in a home PLMN (HPLMN) 316. In this example, the one or more UEs 226 wirelessly communicate with the eNodeB 212 in the VPLMN 314. Similar to the discussion of the PLMN 200 shown in FIG. 2, the VPLMN 314 includes the MME 214, the S-GW 216, the SGSN 218, and the O&M 220, along with their respective interfaces S101, S102, S103, S104, S105. An interface S108 is between the V-CICF 310 in the VPLMN 314 and the H-CICF 312 in the HPLMN 316.

FIG. 3A illustrates a home-routed roaming architecture for E-UTRAN where the HPLMN 316 includes the P-GW 222 and the PCRF 224, along with their respective interfaces S106, S107. FIG. 3B illustrates a local-breakout roaming architecture for E-UTRAN where the VPLMN 314 includes the P-GW 222, along with the interface S106 between the V-CICF 310 and the P-GW 222. The local-breakout roaming architecture also includes a visited PCRF (V-PCRF) 318 having an interface S107(a) with the V-CICF 310 in the VPLMN 314, and a home PCRF (H-PCRF) 320 having an interface S107(b) with the H-CICF 312 in the HPLMN 316.

In both roaming architectures shown in FIGS. 3A and 3B, the V-CICF 310 collects and stores the RCI from the network elements located in the V-PLMN 314. The H-CICF 312 collects and stores the RCI from network elements located in the H-PLMN 316. In the home-routed roaming architecture shown in FIG. 3A, the V-CICF 310 sends its RCI to the H-CICF 312 through the interface S108, and the H-CICF 312 provides both the RCI that the V-CICF 310 has collected and the RCI that the H-CICF has collected to the PCRF 224. In response, the PCRF 224 implements policies for congestion mitigation in the HPLMN 316 and/or the VPLMN 314. In the local-breakout roaming architecture shown in FIG. 3B, the V-CICF 310 sends its stored RCI to the V-PCRF 318 through the interface S107(a), and the H-CICF 312 sends its stored RCI to the H-PCRF 320 through the interface S107(b). In response, the V-PCRF 318 implements policies for congestion mitigation in the VPLMN 314, and the H-PCRF 320 implements policies for congestion mitigation in the HPLMN 316.

Figure 4:
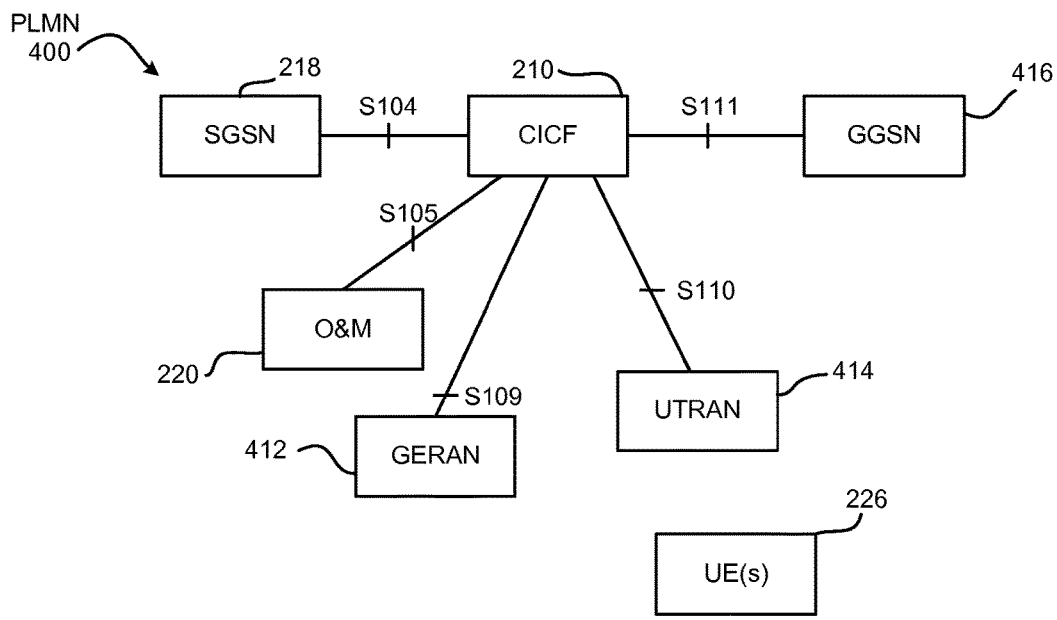
FIG. 4 is a block diagram of another architecture including a centralized node according to one embodiment.

FIG. 4 is a block diagram of an architecture for GERAN/UTRAN including a centralized node (CICF) 210 according to one embodiment. In this example, the one or more UEs 226 wirelessly communicate through a GERAN 412 and/or a UTRAN 414 (e.g., Node B) within a PLMN 400.

Similar to the discussion of the PLMN 200 shown in FIG. 2, the PLMN 400 includes an interface S104 between the CICF 210 and an SGSN 218, and an interface S105 between the CICF 210 and an O&M system 220. The PLMN 400 also includes an interface S109 between the CICF 210 and the GERAN 412, an interface S110 between the CICF 210 and UTRAN 414, and an interface S111 between the CICF 210 and a GGSN 416. Although not shown, the interface S107 defined for the E-UTRAN architecture shown in FIG. 2 can also be used for the GERAN/UTRAN architecture shown in FIG. 4.

The CICF 210 collects and stores RCI. Based on the stored RCI, according to certain embodiments, the CICF 210 triggers the PCRF (not shown) to modify an IP-CAN session. As discussed above with respect to FIG. 2, the PCRF may then provide policies for congestion mitigation.

B. Example Procedures for E-UTRAN to Report RCI to the Core Network

Figure 5A:
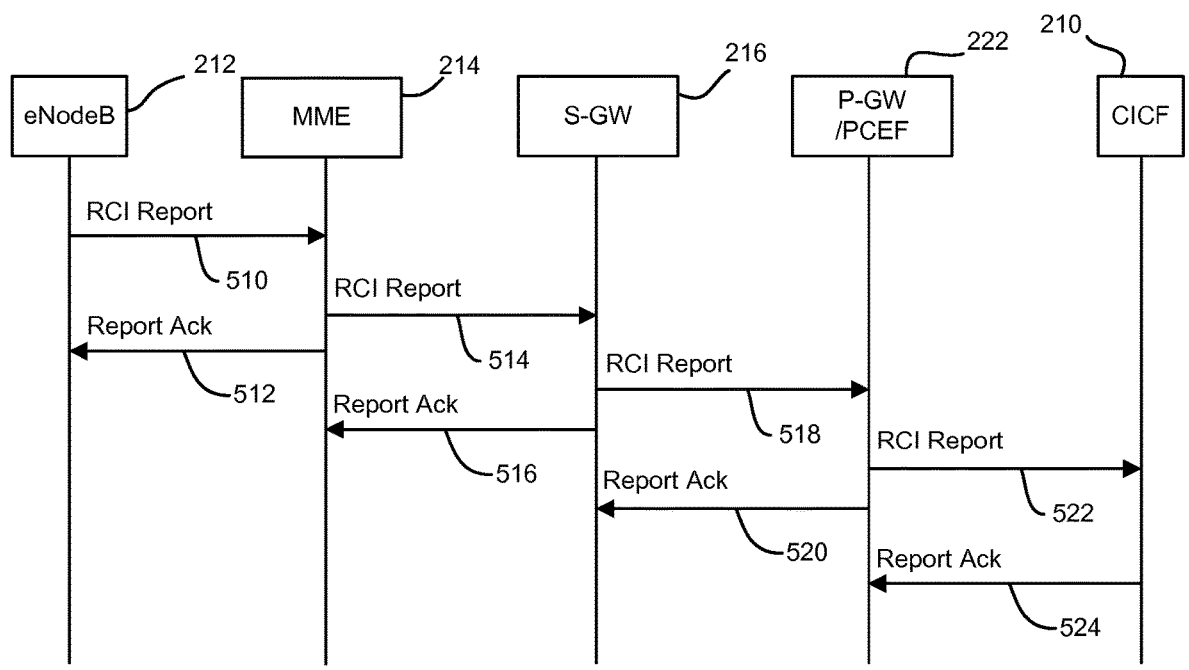
FIGS. 5A and 5B illustrate example processes for reporting RAN user plane congestion information (RCI) via the control plane according to certain embodiments.
Figure 5B:
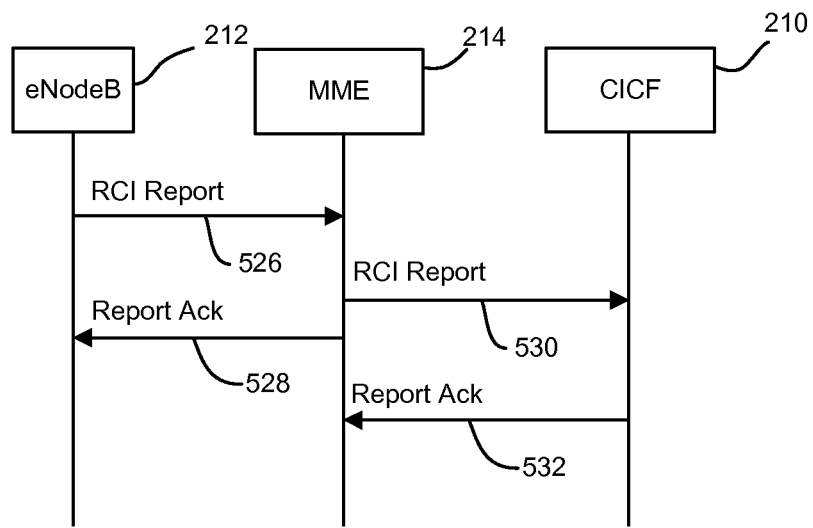

FIGS. 5A and 5B illustrate example processes for reporting RCI via the control plane according to certain embodiments. In FIG. 5A, the P-GW 222 reports RCI to the CICF 210 via the control plane (e.g., S1-MME, S11, and/or S5/S8). The P-GW 222 includes a policy and charging enforcement function (PCEF). The process includes the eNodeB 212 reporting 510 the RCI to the MME 214, which responds by reporting 512 an acknowledgment (Ack). The MME 214 reports 514 the RCI to the S-GW 216, which responds by reporting 516 Ack. The S-GW 216 reports 518 the RCI to the P-GW 222, which responds by reporting 520 Ack. The P-GW 222 may also respond to receiving the RCI by triggering an IP-CAN session modification procedure to accommodate a changed user plane congestion condition. The P-GW 222 reports 522 the RCI to the CICF 210, which responds by reporting 524 Ack.

In FIG. 5B, the MME 214 reports RCI to the CICF 210 via the control plane (e.g., S1-MME). The process includes the eNodeB 212 reporting 526 the RCI to the MME 214, which responds by reporting 528 Ack. The MME 214 may also respond to receiving the RCI by triggering an IP-CAN session modification procedure to accommodate a changed user plane congestion condition. The MME 214 reports 530 the RCI to the CICF 210, which responds by reporting 532 Ack.

Figure 6A:
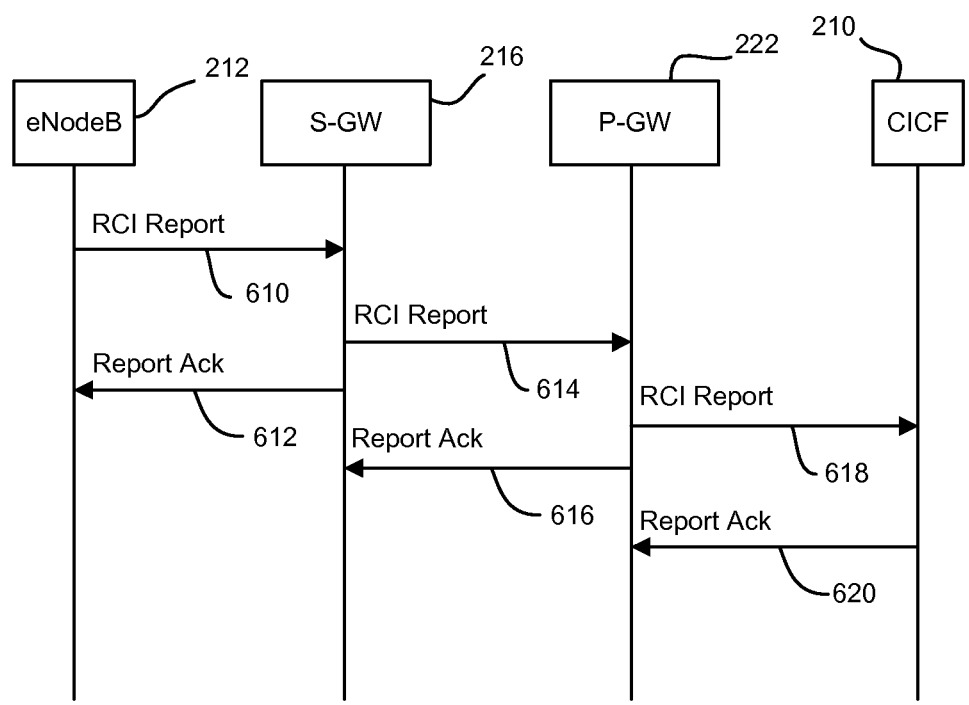
FIGS. 6A and 6B illustrate example processes for reporting RCI via the user plane according to certain embodiments.
Figure 6B:
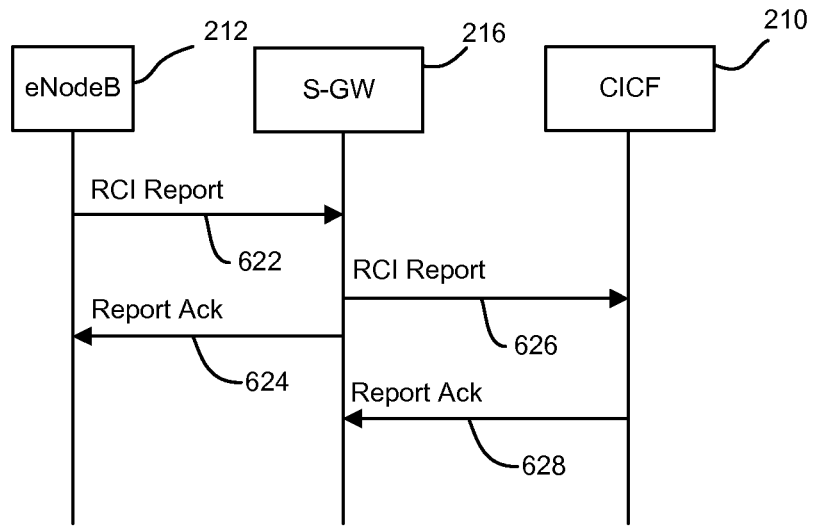

FIGS. 6A and 6B illustrate example processes for reporting RCI via the user plane according to certain embodiments. In FIG. 6A, the P-GW 222 reports RCI to the CICF 210 via the user plane. The process includes the eNodeB 212 reporting 610 the RCI in the GTP-U extension header via the user plane to the S-GW 216, which responds by reporting 612 Ack. The S-GW 216 reports 614 the RCI in the GTP-U extension header via the user plane to the P-GW 222, which responds by reporting 616 Ack. The P-GW 222 may also respond to receiving the RCI by triggering an IP-CAN session modification procedure to accommodate a changed user plane congestion condition. When the P-GW 222 perceives the RCI, the P-GW 222 reports 618 the RCI to the CICF 210, which responds by reporting 620 Ack.

In FIG. 6B, the S-GW 216 reports RCI to the CICF 210 via the user plane. The process includes the eNodeB 212 reporting 622 the RCI in the GTP-U extension header via the user plane to the S-GW 216, which responds by reporting 624 Ack. If the reported RCI indicates S1-U congestion, the S-GW 216 may modify QoS mapping on S1-U and handle that internally. The S-GW 216 may also respond to receiving the RCI by triggering an IP-CAN session modification procedure to accommodate a changed user plane congestion condition. When the S-GW 216 perceives the RCI, the S-GW 216 reports 626 the RCI to the CICF 210, which responds by reporting 628 Ack.

Figure 7A:
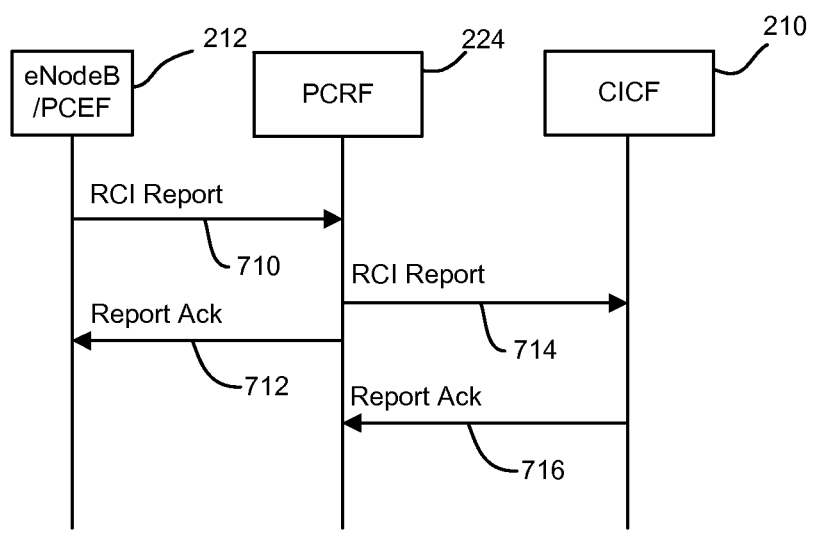
FIGS. 7A and 7B illustrate example processes for reporting RCI using policy and charging control (PCC) according to certain embodiments.
Figure 7B:
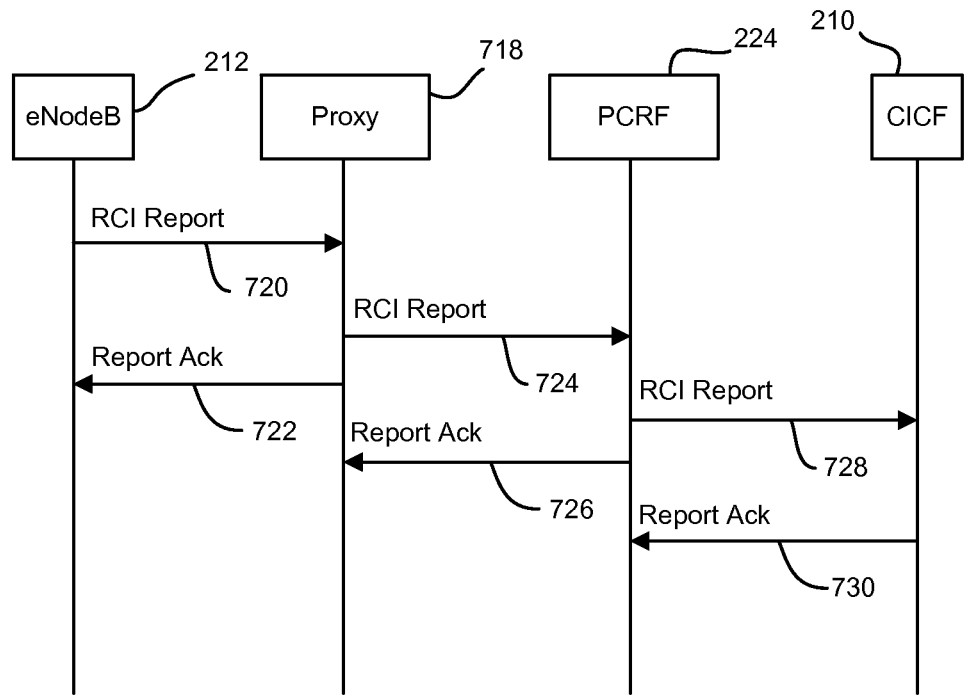

FIGS. 7A and 7B illustrate example processes for reporting RCI using policy and charging control (PCC) according to certain embodiments. In FIG. 7A, RCI is reported to the CICF 219 via the PCRF 224 and PCEF collocated with the RAN node. The process includes the eNodeB 212 and PCEF collocated with the RAN node reporting 710 the RCI to the PCRF 224, which responds by reporting 712 Ack. When the PCRF 224 receives the report, the PCRF may initiate an IP-CAN session modification procedure to accommodate or apply PCC rules provisioned in the PCEF. The PCRF 224 reports 714 the RCI to the CICF 210, which responds by reporting 716 Ack.

In FIG. 7B, RCI is reported to the CICF 210 via a proxy 718 and the PCRF 224. The proxy 718 may be, for example, an O&M server, an ANDSF server, a new server, an MME, or one or more other network element configured to collect RCI from the RAN side. The process includes the eNodeB 212 reporting 720 the RCI to the proxy 718, which responds by reporting 722 Ack. When the proxy 718 receives the reported RCI, the proxy 718 may trigger a UE or the PCRF 224 to enable a related provisioned rule or initiate a relative rule provision or modification procedure. The proxy 718 reports 724 the RCI to the PCRF 224, which responds by reporting 726 Ack. The PCRF 224 reports 728 the RCI to the CICF 210, which responds by reporting 730 Ack.

Figure 8A:
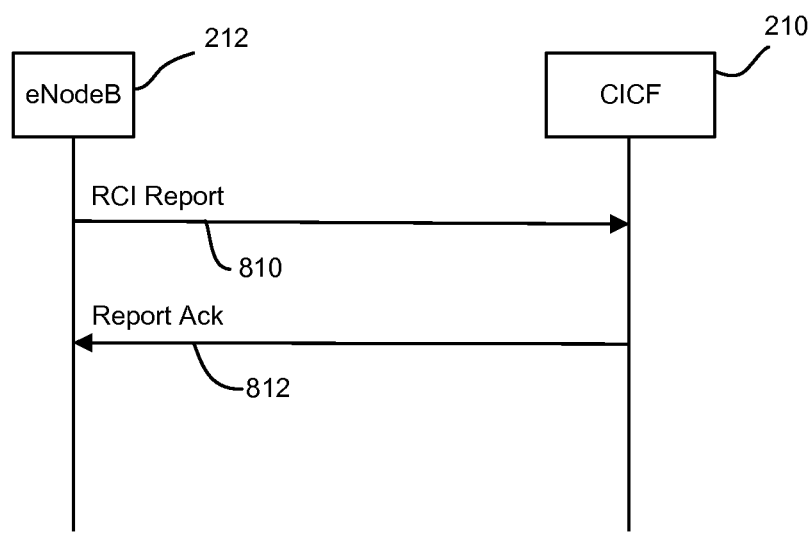
FIGS. 8A, 8B, and 8C illustrate example processes for reporting RCI via the network management plane according to certain embodiments.
Figure 8B:
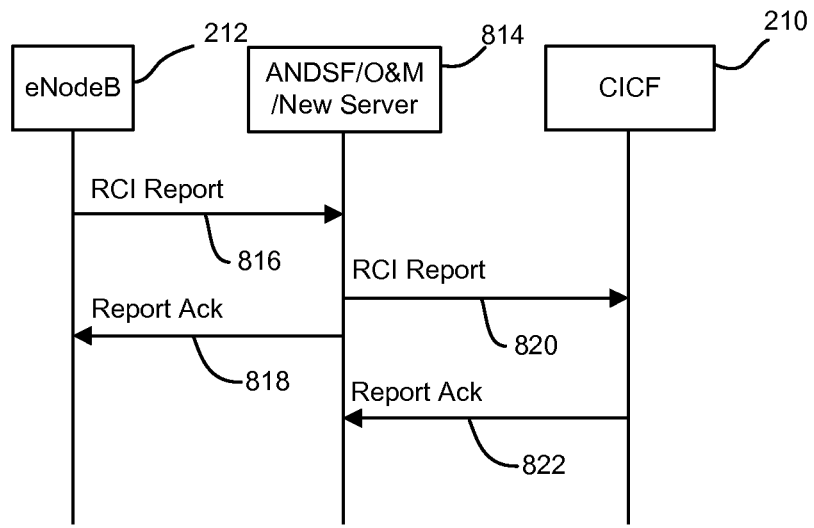
Figure 8C:
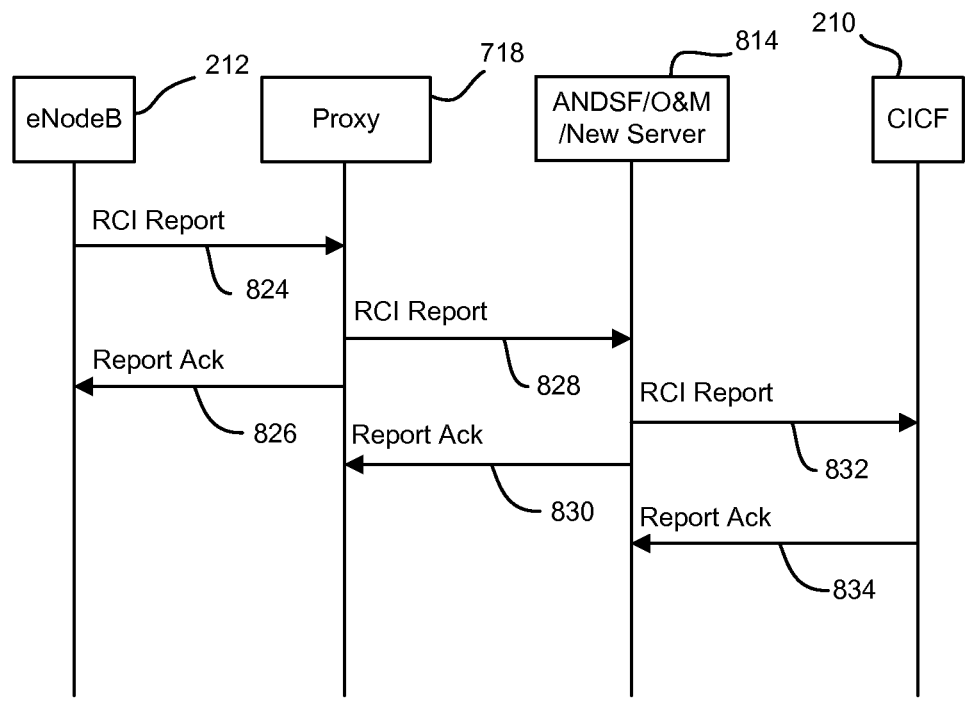

FIGS. 8A, 8B, and 8C illustrate example processes for reporting RCI via the network management plane according to certain embodiments. In FIG. 8A, RCI is reported to the CICF 210 directly from the RAN node. The process includes the eNodeB 212 reporting 810 the RCI to the CICF 210, which responds by reporting 812 Ack. In FIG. 8B, RCI is reported to the CICF 210 via a server 814. The server 814 may be, for example, an ANDSF server, an O&M server, or a new type of server. The process includes the eNodeB 212 reporting 816 the RCI to the server 814, which responds by reporting 818 Ack. The server 814 reports 820 the RCI to the CICF 210, which responds by reporting 822 Ack. In FIG. 8C, RCI is reported to the CICF 210 via the proxy 718 and the server 814. The process includes the eNodeB 212 reporting 824 the RCI to the proxy 718, which responds by reporting 826 Ack. The proxy 718 reports 828 the RCI to the server 814, which responds by reporting 830 Ack. The server 814 reports 832 the RCI to the CICF 210, which responds by reporting 834 Ack.

C. Example Procedures for GERAN/UTRAN to Report RCI to the Core Network

Figure 9A:
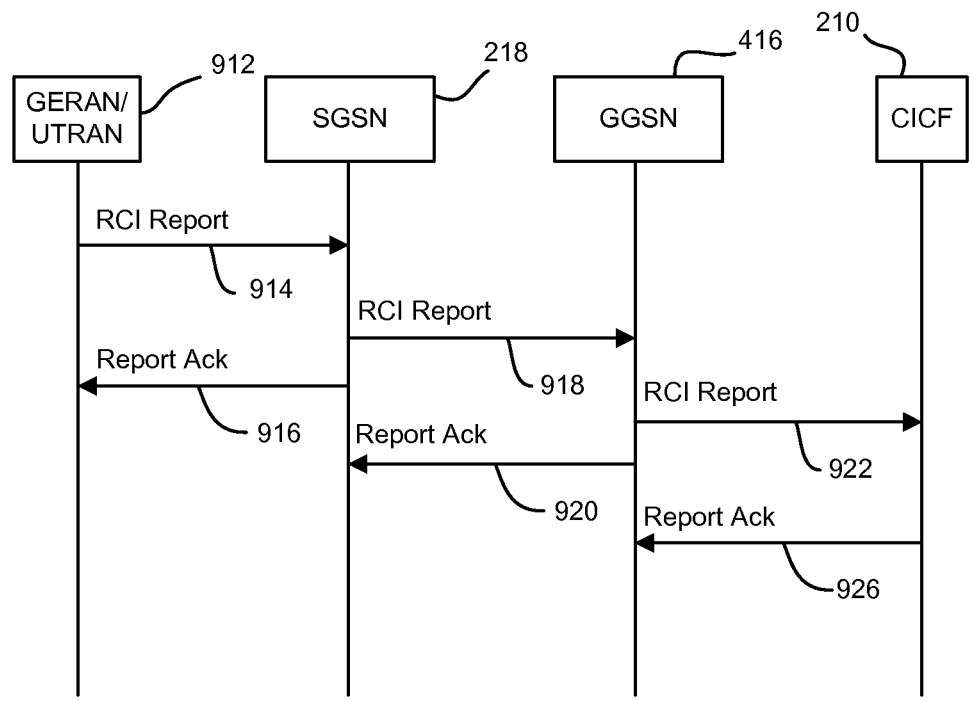
FIGS. 9A and 9B illustrate example processes for reporting RCI via the control plane according to certain embodiments.
Figure 9B:
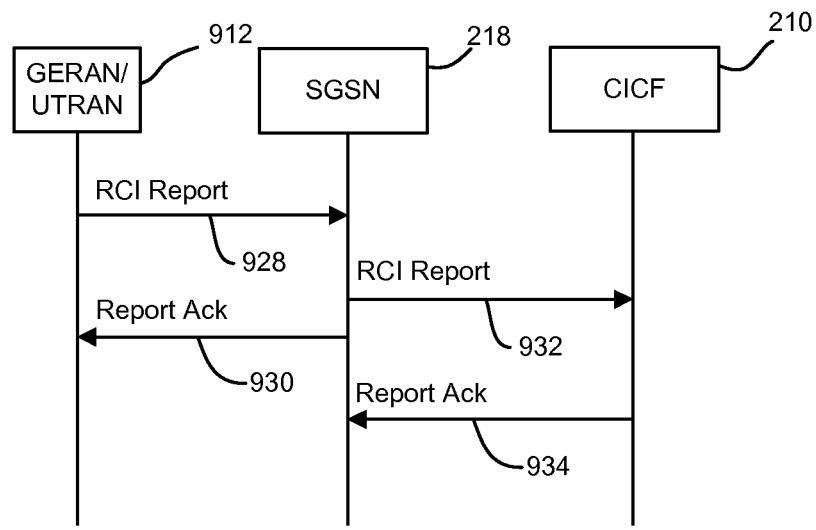

FIGS. 9A and 9B illustrate example processes for reporting RCI via the control plane according to certain embodiments. The following examples apply to a GERAN/UTRAN 912. See, for example, the architecture shown in FIG. 4. In FIG. 9A, the GGSN 416 reports RCI to the CICF 210 via the control plane. The process includes the GERAN/UTRAN 912 reporting 914 the RCI to the SGSN 218, which responds by reporting 916 Ack. The SGSN 218 reports 918 the RCI to the GGSN 416, which responds by reporting 920 Ack. The GGSN 416 may also respond to receiving the RCI by triggering a context modification procedure to accommodate a changed user plane congestion condition. The GGSN 416 reports 922 the RCI to the CICF 210, which responds by reporting 926 Ack.

In FIG. 9B, the SGSN 218 reports RCI to the CICF 210 via the control plane. The process includes the GERAN/UTRAN 912 reporting 914 the RCI to the SGSN 218, which responds by reporting 930 Ack. The SGSN 218 may also respond to receiving the RCI by triggering PDP context and/or an IP-CAN session modification procedure to accommodate a changed RAN user plane congestion condition. The SGSN 218 reports 932 the RCI to the CICF 210, which responds by reporting 934 Ack.

Figure 10A:
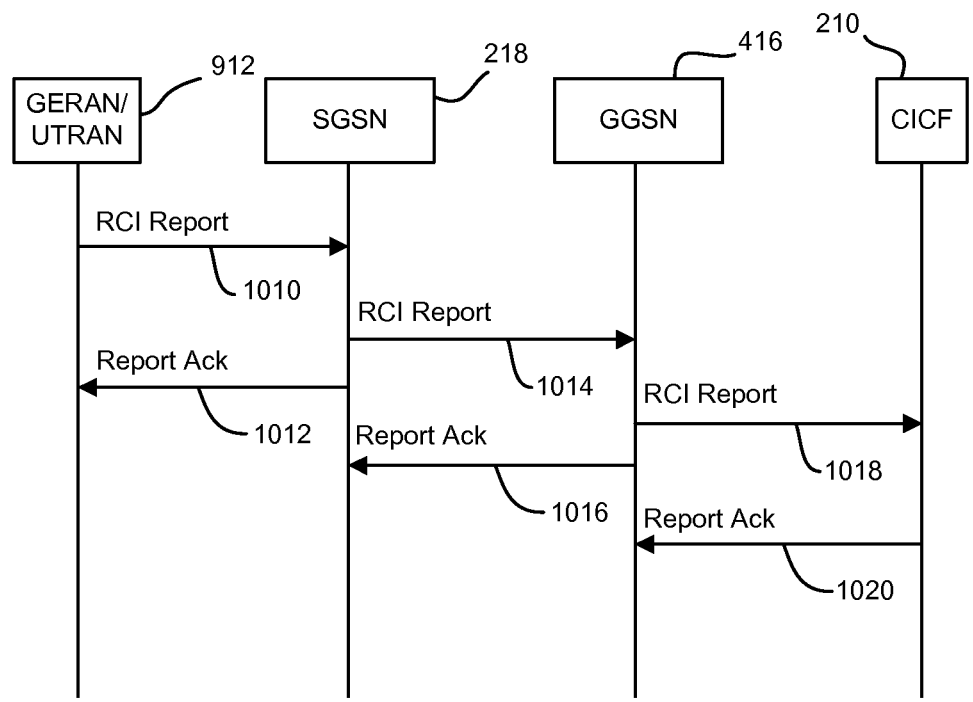
FIGS. 10A and 10B illustrate example processes for reporting RCI via the user plane according to certain embodiments.
Figure 10B:
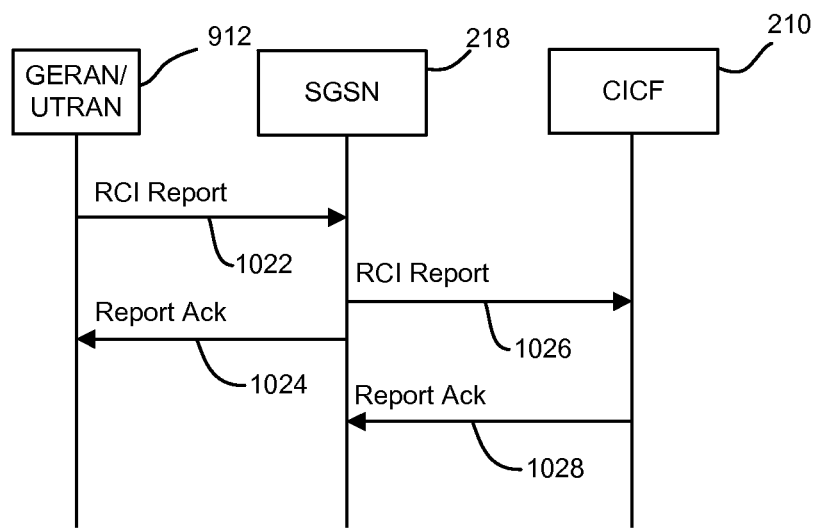

FIGS. 10A and 10B illustrate example processes for reporting RCI via the user plane according to certain embodiments. In FIG. 10A, the GGSN 416 reports RCI to the CICF 210 via the user plane. The process includes the GERAN/UTRAN 912 reporting 1010 the RCI in the GTP-U extension header via the user plane to the SGSN 218, which responds by reporting 1012 Ack. The SGSN 218 reports 1014 the RCI in the GTP-U extension header via the user plane to the GGSN 416, which responds by reporting 1016 Ack. The GGSN 416 may also respond to receiving the RCI by triggering a context modification procedure to accommodate a changed user plane congestion condition. The GGSN 416 reports 1018 the RCI to the CICF 210, which responds by reporting 1020 Ack.

In FIG. 10B, the SGSN 218 reports RCI to the CICF 210 via the user plane. The process includes the GERAN/UTRAN 912 reporting 1022 the RCI in the GTP-U extension header via the user plane to the SGSN 218, which responds by reporting 1024 Ack. The SGSN 218 may also respond to receiving the RCI by triggering PDP context and/or an IP-CAN session modification procedure to accommodate a changed RAN user plane congestion condition. The SGSN 218 reports 1026 the RCI to the CICF 210, which responds by reporting 1028 Ack.

Figure 11A:
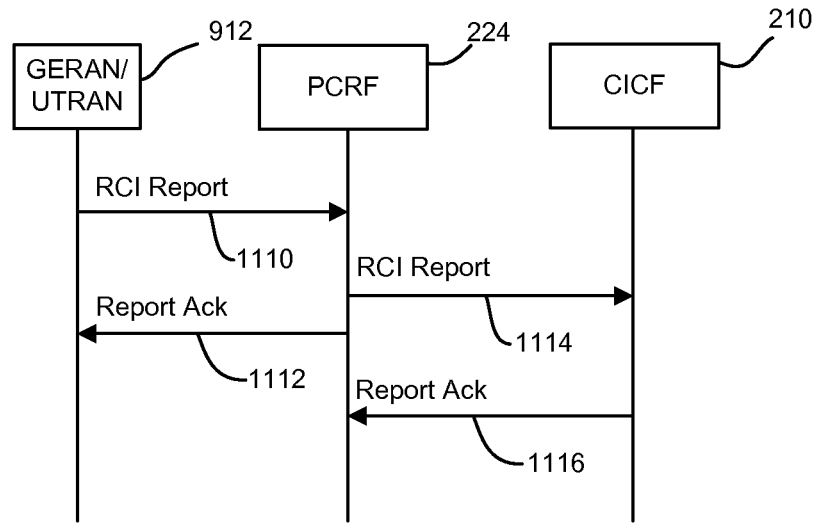
FIGS. 11A and 11B illustrate example processes for reporting RCI using PCC according to certain embodiments.
Figure 11B:
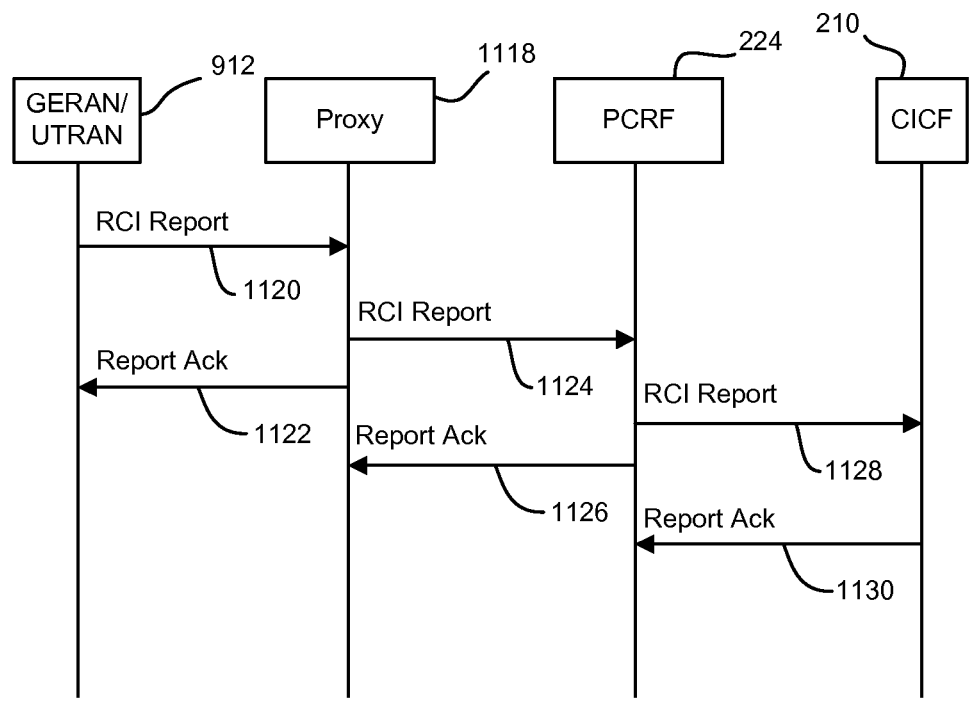

FIGS. 11A and 11B illustrate example processes for reporting RCI using PCC according to certain embodiments.

In FIG. 11A, RCI is reported to the CICF 219 via the PCRF 224 and a PCEF collocated with the RAN node. The process includes the GERAN/UTRAN 912 and PCEF collocated with the RAN node reporting 1110 the RCI to the PCRF 224, which responds by reporting 1112 Ack. When the PCRF 224 receives the report, the PCRF may initiate an IP-CAN session modification procedure to accommodate or apply PCC rules provisioned in the PCEF. The PCRF 224 reports 1114 the RCI to the CICF 210, which responds by reporting 1116 Ack.

In FIG. 11B, RCI is reported to the CICF 210 via the proxy 1118 and the PCRF 224. The proxy 1118 may be, for example, an O&M server, an ANDSF server, a new server, or one or more other network elements configured to collect RCI from the RAN side. The process includes the GERAN/UTRAN 912 reporting 1120 the RCI to the proxy 1118, which responds by reporting 1122 Ack. When the proxy 1118 receives the reported RCI, the proxy 1118 may trigger a UE or the PCRF 224 to enable a related provisioned rule or initiate a relative rule provision or modification procedure. The proxy 1118 reports 1124 the RCI to the PCRF 224, which responds by reporting 1126 Ack. The PCRF 224 reports 1128 the RCI to the CICF 210, which responds by reporting 1130 Ack.

Figure 12A:
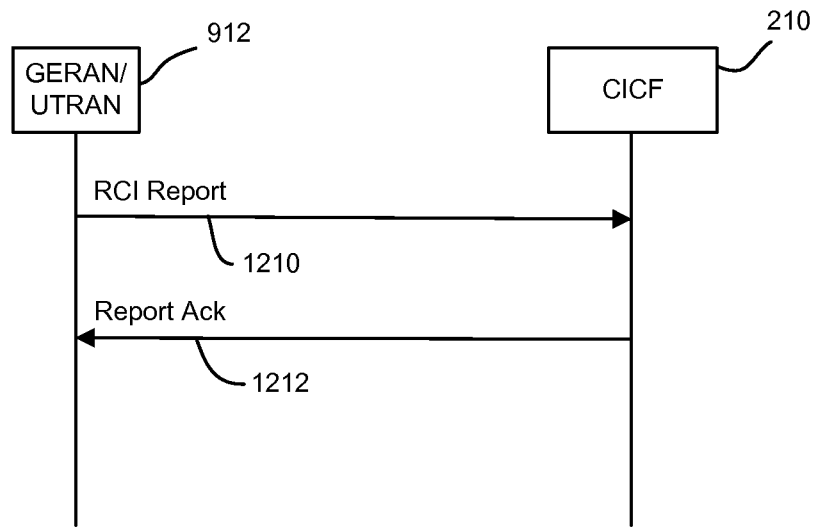
FIGS. 12A, 12B, and 12C illustrate example processes for reporting RCI via the network management plane according to certain embodiments.
Figure 12B:
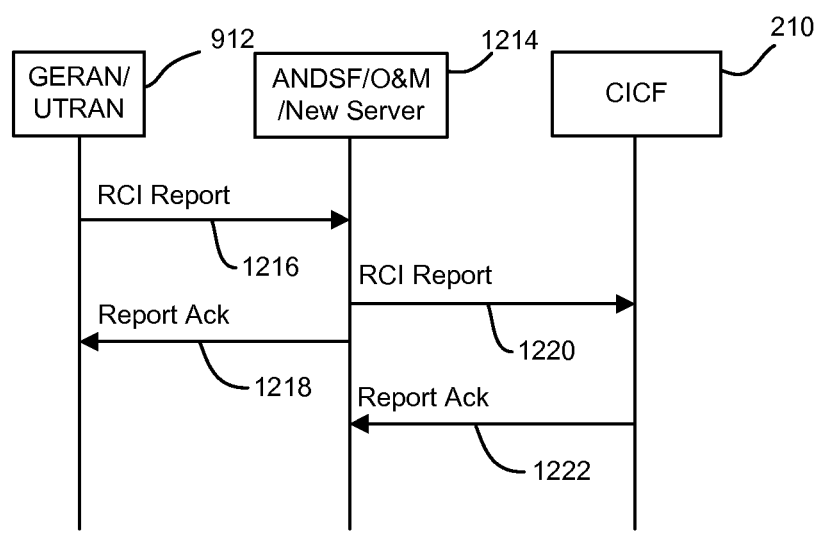
Figure 12C:
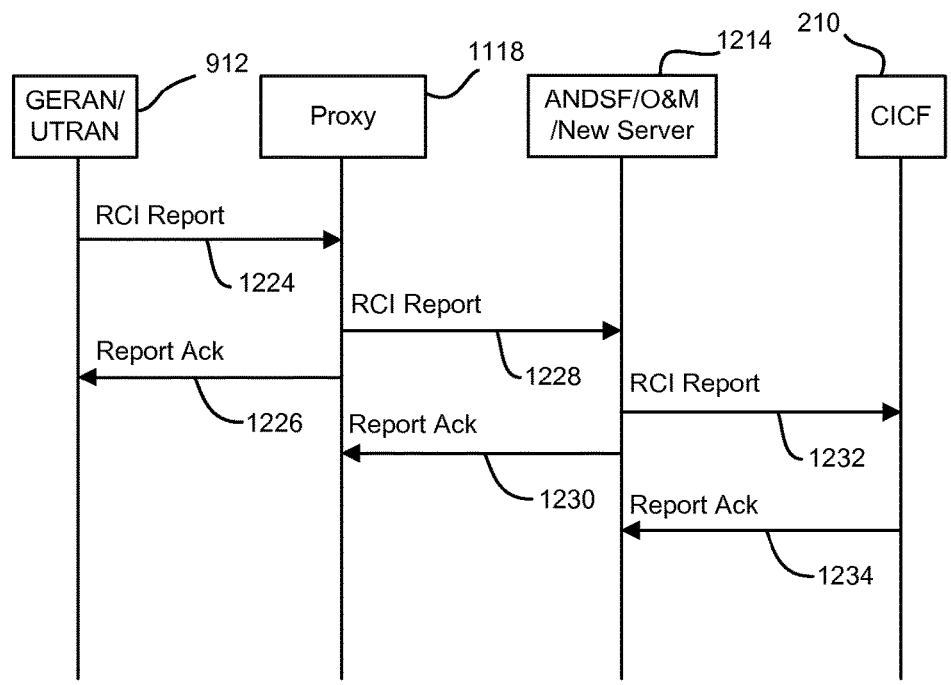

FIGS. 12A, 12B, and 12C illustrate example processes for reporting RCI via the network management plane according to certain embodiments. In FIG. 12A, RCI is reported to the CICF 210 directly from the RAN node. The process includes the GERAN/UTRAN 912 reporting 1210 the RCI to the CICF 210, which responds by reporting 1212 Ack. In FIG. 12B, RCI is reported to the CICF 210 via a server 1214. The server 1214 may be, for example, an ANDSF server, an O&M server, or a new type of server. The process includes the GERAN/UTRAN 912 reporting 1216 the RCI to the server 1214, which responds by reporting 1218 Ack. The server 1214 reports 1220 the RCI to the CICF 210, which responds by reporting 1222 Ack. In FIG. 12C, RCI is reported to the CICF 210 via the proxy 1118 and the server 1214. The process includes the GERAN/UTRAN 912 reporting 1224 the RCI to the proxy 1118, which responds by reporting 1226 Ack. The proxy 1118 reports 1228 the RCI to the server 1214, which responds by reporting 1230 Ack. The server 1214 reports 1232 the RCI to the CICF 210, which responds by reporting 1234 Ack.

D. Example CICF Procedures

In one embodiment, a CICF collects RCI directly from a RAN node or from one or more other network elements such as an O&M system, an ANDSF server, a different or new type of server, an MME, an S-GW, an SGSN, a GGSN, and/or a P-GW. The CICF stores the RCI for a period of time, and discovers one or more proper PCRFs for UEs impacted by user plane congestion. The CICF also queries for and receives a list of UEs and related APNs for each UE from the MME and SGSN by supplying a cell ID (cell global ID).

Figure 13:
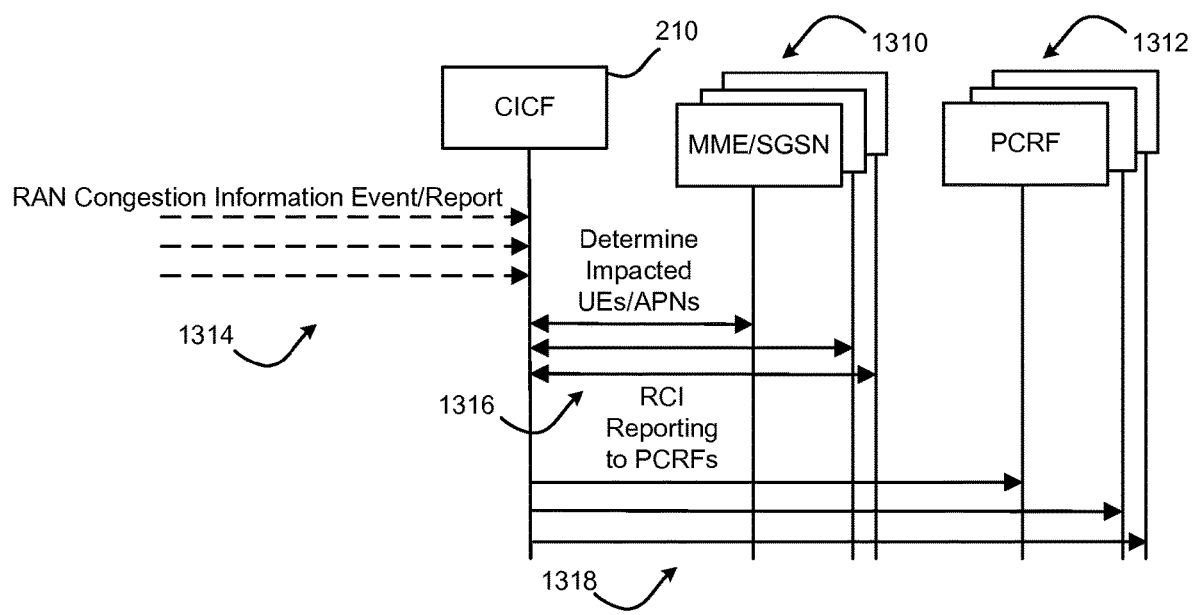
FIG. 13 illustrates an example process for managing RCI in a core network according to one embodiment.

FIG. 13 illustrates an example process for a CICF 210 to manage RCI in a core network according to one embodiment. In this example, the CICF 210 communicates with one or more MME/SGSN 1310 and one or more PCRF 1312 (such as the MME 214, SGSN 218, and PCRF 224 shown in FIG. 2). In summary, the process includes the CICF 210 receiving 1314 one or more RAN congestion information event or report, determining 1316 impacted UEs and APNs, and reporting 1318 RCI to the one or more PCRF 1312.

As discussed in detail above, there are several embodiments for the CICF 210 to receive 1314 one or more RAN congestion information event or report. See, for example, FIGS. 5A-8C. In addition, or in other embodiments, an event or report is sent to the CICF 210 due to a change of radio node/cell user plane congestion status (e.g., when a pre-configured congestion/congestion abatement threshold has been reached). This notification includes an indication of the affected area (e.g., ENB-ID or service area ID), as well as the congestion level. The CICF 210 may also solicit the RCI based on a configured interval. In certain embodiments, one or more CICFs is configured to serve a geographical area.

The CICF 210 determines 1316 the list of UEs impacted by the RAN congestion in a cell by communicating with the one or more MME/SGSN 1310. In certain E-UTRAN embodiments, the CICF 210 subscribes onto an MME to get a list of UEs in the affected area. To achieve this, the CICF 210 constructs a tracking area identity (TAI) based fully qualified domain name (FQDN) for MME discovery. The CICF 210 may, for example, receive the TAIs supported by the affected area from the RAN's O&M.

The CICF 210 receives the list of MMEs serving the TAIs supported by the affected area and establishes an interface (e.g., the interface S102 shown in FIG. 2) towards those MMEs. Once the interface has been established, the CICF 210 queries via the interface for the list of UEs in the affected area. In response, the MMEs provide the list of IMSIs and the list of APNs of the active PDN connections of each of those IMSIs to the CICF 210. In certain embodiments, the CICF 210 does not need to remember the list of IMSI(s) (and their activated APN) as it is refreshed each time the CICF 210 interacts with the MME. The CICF 210 uses the list of APNs of the UEs' active PDN connections to discover the serving PCRFs.

For E-UTRAN embodiments, the CICF 210 also indicates whether it requests the list of UEs per ECGI or eNB ID. Consequently, depending on the level of granularity requested by the CICF 210, the MME may need (or may not need) to activate location reporting over S1-AP. Whether the CICF 210 requests the list of UEs per ECGI or eNB ID may, for example, be based on local configuration.

For UTRAN embodiments, the CICF 210 receives the list of UEs (IMSIs) impacted by a change of RCI in a cell from the RAN's O&M. The O&M may have received this information from the RAN (e.g., the IMSI is sent by the SGSN over the Iu interface in a radio access network application part (RANAP) common ID message). Thus, in certain UTRAN embodiments, the CICF 210 queries the SGSN only for the APNs of the active PDN connections of a given impacted IMSI. To achieve this according to certain embodiments, the CICF 210 constructs a routing area identity (RAI) based FQDN for SGSN discovery. The CICF 210 may, for example, receive the RAIs supported by the affected area from the RAN's O&M.

The CICF 210 receives the list of SGSNs serving the RAIs supported by the affected area and establishes an interface (e.g., the interface S104 shown in FIG. 2) towards those SGSNs. Once the interface has been established, the CICF 210 passes the list of UEs (IMSIs) in the congested area to the SGSNs. In response, the SGSNs provide the list of APNs of the active PDN connections of each of the reported IMSIs to the CICF 210. The CICF 210 uses the list of APNs of the UEs' active PDN connections to discover the serving PCRFs.

It should be noted that as both temporal and "spatial" integration are provided, the RCI sent to the PCRF according to certain embodiments does not intend to provide the PCRF with information on the instantaneous congestion status in a given cell. This may be consistent with the information being used to act on a sustained congestion status in an area. In some cases, the PCRF still considers that a fast moving UE is in a congested area while the UE has already moved to a non-congested area. It should also be noted that in some scenarios, the core network may not know all the cells and/or eNodeBs that a given UE is using (multi-site CA, small cells). As a consequence, in certain embodiments, the RCI reporting may not reflect the actual congestion status of all the cells from which the UE is currently using resources.

In certain embodiments, the CICF 210 may, based on local policies, further process the information received from the RAN in order to build the RCI. For example, the CICF 210 may integrate the RAN congestion status based on time (e.g., to provide the PCRF 210 only with sustained congestion levels). In addition, or in another embodiment, the CICF 210 may provide "spatial" integration of the RAN congestion information due to mobility and to the UE possibly being served by multiple cells (e.g., due to multi-cell carrier aggregation). Thus, the RCI associated with a cell may depend on the congestion status in the neighboring cells. As another example for LTE, as many RAN features (e.g., carrier aggregation, CoMP, etc.) may involve multiple cells of an eNodeB and as intra-eNodeB mobility reporting is generally not activated (e.g., to save signaling), RCI at the eNodeB level may provide enough information. This does not, however, preclude RCI reporting at the cell level. In an example embodiment of network sharing, the CICF 210 and the PCRF belong to different operators. The CICF 210 may apply local policies related to the information it sends to PCRFs of different operators. In another example embodiment, the CICF 210 uses the IMSI to determine the PLMN of the UE and whether it should apply local policies related to the information it sends to PCRFs of different operators. In another example embodiment cased on local policies, the RCI being sent may also depend on the relative RAN usage of the various operators sharing RAN resources.

In the process shown in FIG. 13, the CICF reports 1318 RCI to the PCRFs that are serving the impacted UEs. In certain embodiments, the CICF 210 reports RCI per IMSI/APN to the PCRFs. Based on the list of impacted UEs (IMSIs) and on the list of APNs of their active PDN connections, the CICF 210 notifies the PCRFs serving those UEs and APN(s). In embodiments with networks including multiple PCRFs, a diameter routing agent (DRA) may be deployed. The CICF 210 use the DRA to contact the PCRF(s). When the Gx interface gets established, the DRA "assigns" a PCRF for a given IMSI/APN combination and remembers the relationship (e.g., IMSI, APN, selected PCRF). Based on this relationship, DRAs support finding the PCRF serving an IMSI/APN combination.

III. Additional Example Embodiments

The following are examples of further embodiments:

In Example 1, a core network node in a wireless communication system. The core network node comprises a first interface, a second interface, and a third interface. The first interface to receive RCI. The core network node to determine a UE associated with the RCI. The second interface to communicate with an SGSN. The core network node to identify the UE to the SGSN through the second interface. The core network node to receive an APN corresponding to the UE from the SGSN. The third interface to report the RCI to a PCRF associated with the APN for congestion mitigation.

Example 2 includes the core network node of Example 1, wherein the wireless communication system comprises an E-UTRAN. The core network node further comprising a fourth interface to communicate with an MME. To determine the UE, the core network node is configured to receive a UE identifier from the MME through the fourth interface.

Example 3 includes the core network node of Example 1, wherein the wireless communication system comprises a UTRAN and GERAN. To determine the UE, the core network node is configured to receive a UE identifier from an O&M system of the RAN.

Example 4 includes the core network node of Examples 2 or 3, wherein the UE identifier comprises an IMSI corresponding to the UE associated with the RCI.

Example 5 includes the core network node of Example 1, wherein the RCI includes one or more IE selected from a group comprising a first IE for a congested interface direction and node, a second IE for a congestion severity level, a third IE for a congestion situation indicating a change in whether or not congestion is detected, a fourth IE for congestion cell location information, a fifth IE for identifying the UE, a sixth IE for identifying a user associated with the UE, a seventh IE for identifying the APN, an eighth IE for PDP context information, and a ninth IE for an EPS bearer identifier.

Example 6 includes the core network node of Example 5, wherein the first IE for the congested interface direction and node includes at least one interface or node identifier selected from a group comprising a radio interface downlink identifier, a radio interface uplink identifier, a network interface downlink identifier, a network interface uplink identifier, a RAN node identifier.

Example 7 includes the core network node of Example 5, wherein the fifth IE for identifying the UE comprises an IMEI, and wherein the sixth IE for identifying a user associated with the UE comprises an IMSI.

Example 8 includes the core network node of Example 1, and further includes a memory device to store the RCI received through the first interface, and a processor to process the stored RCI and to trigger the PCRF to modify an IP-CAN session.

In Example 9 a method for user plane congestion awareness in a mobile network includes receiving and storing an event or report indicating a change in a radio node or cell user plane congestion status. The event or report includes an indication of one or more congested areas and corresponding congestion levels. The method further includes determining, based on the received event or report, a list of UEs and associated active connections in the one or more congested areas, identifying one or more network elements configured to adjust a QoS for the one or more congested areas, respectively, and communicating user plane congestion information to the one or more identified network elements serving the list of UEs.

Example 10 includes the method of Example 9, wherein receiving and storing the event or report comprises receiving the event or report from a RAN, and storing the event or report for a predetermined period of time.

Example 11 includes the method of Example 10, and further includes sending a request to the RAN for the event or report based on a configured time interval.

Example 12 includes the method of Example 9, wherein receiving and storing the event or report comprises receiving the event or report from one or more network elements selected from a group comprising an O&M system, an ANDSF server, an MME, an S-GW, an SGSN, a GGSN, and a P-GW.

Example 13 includes the method of Example 9, wherein determining the list of UEs comprises determining one or more MMEs associated with the one or more congested areas, establishing an interface toward the one or more MMEs, querying, via the interface, for the list of UEs, and receiving, via the interface, a list of IMSIs associated with the list of UEs.

Example 14 includes the method of Example 13, and further includes receiving, via the interface, a list of APNs of the associated active connections corresponding the list of IMSIs, and using the list of APNs to identify the one or more network elements configured to adjust the QoS for the one or more congested areas, wherein the one or more elements comprise respective PCRF nodes.

Example 15 includes the method of Example 13, wherein determining the one or more MMEs associated with the one or more congested areas comprises determining TAIs based FQDN for MME discovery, and receiving, from an O&M system of a RAN, a list of the TAIs supported by the one or more congested areas.

Example 16 includes the method of Example 9, wherein determining the list of UEs comprises receiving, from an O&M system of a RAN, a list of IMSIs associated with the list of UEs, determining one or more SGSNs associated with the one or more congested areas, establishing an interface toward the one or more SGSNs, querying, via the interface, a list of APNs of the associated active connections corresponding the list of IMSIs and using the list of APNs to identify the one or more network elements configured to adjust the QoS for the one or more congested areas. The one or more elements comprise respective PCRF nodes.

In Example 17 a server includes a processor, a storage device, and a CICF. The storage device to store an indication that demand for radio access network resources exceeds available capacity in an identified area of a wireless cellular network. The CICF comprises instructions that, when executed by the processor, manage congestion information for the wireless cellular network. The CICF configured to discover an MME serving the identified area of the wireless cellular network, request and receive, from the MME, a list of IMSIs associated with the identified area of the wireless cellular network, discover a network node associated with the list of IMSIs and configured to initiate an IP-CAN session modification procedure, and notify the network node configured to initiate the IP-CAN session modification of the demand for radio access network resources.

Example 18 includes the server of Example 17, wherein the CICF is further configured to receive, from an O&M system, the indication that demand for radio access network resources exceeds available capacity.

Example 19 includes the server of Example 18, wherein the CICF is further configured to receive, from the O&M system, TAI supported by the identified area of the wireless cellular network, and use the TAI to discover the MME.

Example 20 includes the server of Example 17, wherein the CICF is further configured to receive, from the MME in response to the request for the list of IMSIs, a corresponding list of APNs of active PDN connections.

Example 21 includes the server of Example 20, wherein the discovered network node associated with the list of IMSIs comprises a PCRF associated with the APNs.

Example 22 includes the server of Example 17, wherein the CICF is further configured to receive the indication that demand for radio access network resources exceeds available capacity through one or more interface selected from a group comprising a user plane interface, a control plane interface, and a network management plane interface.

In Example 23 an RCAF node in a core network of a wireless communication system includes means for receiving and storing an event or report indicating a change in a radio node or cell user plane congestion status. The event or report including an indication of one or more congested areas and corresponding congestion levels. The RCAF further includes means for determining, based on the received event or report, a list of UEs and associated active connections in the one or more congested areas, means for identifying one or more network elements configured to adjust a QoS for the one or more congested areas, respectively, and means for communicating user plane congestion information to the one or more identified network elements serving the list of UEs.

Example 24 includes the RCAF node of Example 23, and further includes means for receiving the event or report from a RAN, and means for storing the event or report for a predetermined period of time.

Example 25 includes the RCAF node of Example 24, and further includes means for sending a request to the RAN for the event or report based on a configured time interval.

Example 26 includes the RCAF node of Example 23, wherein receiving and storing the event or report comprises receiving the event or report from one or more network elements selected from a group comprising an O&M system, an ANDSF server, an MME, an S-GW, a SGSN, a GGSN, and a P-GW.

Example 27 includes the RCAF node of Example 23, and further includes means for determining one or more MMEs associated with the one or more congested areas, means for establishing an interface toward the one or more MMEs, means for querying, via the interface, for the list of UEs, and means for receiving, via the interface, a list of IMSIs associated with the list of UEs.

Example 28 includes the RCAF node of Example 27, and further includes means for receiving, via the interface, a list of APNs of the associated active connections corresponding the list of IMSIs, and means for using the list of APNs to identify the one or more network elements configured to adjust the QoS for the one or more congested areas, wherein the one or more elements comprise respective PCRF nodes.

Example 29 includes the RCAF node of Example 27, and further includes means for determining TAI based FQDN for MME discovery, and means for receiving, from an O&M system of a RAN, a list of the TAIs supported by the one or more congested areas.

Example 30 includes the RCAF node of Example 23, and further includes means for receiving, from an O&M system of a RAN, a list of IMSIs associated with the list of UEs, means for determining one or more SGSNs associated with the one or more congested areas, means for establishing an interface toward the one or more SGSNs, means for querying, via the interface, a list of APNs of the associated active connections corresponding the list of IMSIs, and means for using the list of APNs to identify the one or more network elements configured to adjust the QoS for the one or more congested areas, wherein the one or more elements comprise respective PCRF nodes.

In Example 31 a method includes receiving RCI through a first interface, determining a UE associated with the RCI, communicating through a second interface with an SGSN an identity of the UE, receiving an APN corresponding to the UE from the SGSN, and reporting through a third interface the RCI to a PCRF associated with the APN for congestion mitigation.

Example 32 includes the method of Example 31, and further includes communicating, through a fourth interface, with a MME. Determining the UE comprises receiving a UE identifier from the MME through the fourth interface.

Example 33 includes the method of Examples 32, wherein the UE identifier comprises an IMSI corresponding to the UE associated with the RCI.

Example 34 includes the method of Example 31, wherein the RCI includes one or more IE selected from a group comprising a first IE for a congested interface direction and node, a second IE for a congestion severity level, a third IE for a congestion situation indicating a change in whether or not congestion is detected, a fourth IE for congestion cell location information, a fifth IE for identifying the UE, a sixth IE for identifying a user associated with the UE, a seventh IE for identifying the APN, an eighth IE for PDP context information, and a ninth IE for an EPS bearer identifier.

Example 35 includes the method of Example 34, wherein the first IE for the congested interface direction and node includes at least one interface or node identifier selected from a group comprising a radio interface downlink identifier, a radio interface uplink identifier, a network interface downlink identifier, a network interface uplink identifier, a RAN node identifier.

Example 36 includes the method of Example 34, wherein the fifth IE for identifying the UE comprises an IMEI, and wherein the sixth IE for identifying a user associated with the UE comprises an IMSI.

Example 37 includes the method of Example 31, and further includes receiving the RCI through the first interface, and processing the RCI and triggering the PCRF to modify an IP-CAN session.

In Example 38, an apparatus includes means to perform a method as claimed in any of Examples 9-16 or 31-37.

In Example 39, a machine-readable storage including machine-readable instructions, when executed, to implement a method or realize an apparatus as claimed in any preceding Example.

Various techniques described herein, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A radio access network (RAN) congestion awareness function (RCAF) element, the RCAF element comprising:
   a first interface between the RCAF element and an operations and maintenance (O&M) system to receive RAN user plane congestion information (RUCI) from the O&M system, the RCAF element to process the RUCI to determine a congestion level of a base station or a cell;
   a second interface between the RCAF element and a mobility management entity (MME) to request and receive a list of international mobile subscriber identities (IMSIs) served by the base station or cell, and to receive, in response to the request for the list of IMSIs, a corresponding list of access point names (APNs) of active packet data network (PDN) connections from the MME; and
   a third interface between the RCAF element and a policy and charging rules function (PCRF) serving the PDN connection for congestion mitigation to report the RUCI to the PCRF, wherein the PCRF is identified from a plurality of PCRFs using the list of APNs, wherein the RCAF element uses the RUCI from the first interface to determine a congested base station or congested cell, uses the list of IMIs from the second interface to determine a user equipment (UE) served by the congested base station or congested cell, and uses the third interface to report the RUCI to the PCRF associated with the list of APNs from the second interface.

2. The RCAF element of claim 1, wherein the RCAF element is configured to receive a UE identifier, wherein the UE identifier comprises an international mobile subscriber identity (IMSI) corresponding to the UE served by the base station or cell.

3. The RCAF element of claim 1, wherein the RUCI includes one or more information element (IE) selected from a group comprising a first IE for a congested interface direction and node, a second IE for a congestion severity level, a third IE for a congestion situation indicating a change in whether or not congestion is detected, a fourth IE for congestion cell location information, a fifth IE for identifying the UE, a sixth IE for identifying a user associated with the UE, a seventh IE for identifying an APN from the list of APNs, an eighth IE for packet data protocol (PDP) context information, and a ninth IE for a bearer identifier.

4. The RCAF element of claim 3, wherein the first IE for the congested interface direction and node includes at least one interface or node identifier selected from a group comprising a radio interface downlink identifier, a radio interface uplink identifier, a network interface downlink identifier, a network interface uplink identifier, a RAN node identifier.

5. The RCAF element of claim 3, wherein the fifth IE for identifying the UE comprises an international mobile equipment identity (IMEI), and wherein the sixth IE for identifying a user associated with the UE comprises an international mobile subscriber identity (IMSI).

6. The RCAF element of claim 1, further comprising:
a memory device to store the RUCI received through the first interface; and
a processor to process the stored RUCI and to trigger the PCRF to modify an internet protocol connectivity access network (IP-CAN) session.

7. A method for user plane congestion awareness in a mobile network, the method comprising:
receiving and storing an event or report indicating a change in a radio node or cell user plane congestion status with an radio access network (RAN) congestion awareness function (RCAF) element from an operations and maintenance (O&M) system, the event or report including an indication of one or more congested areas and corresponding congestion levels;
determining one or more mobility management entities (MMES) associated with the one or more congested areas;
establishing an interface between the one or more MMES and the RCAF element;
determining, through the interface, wireless communication devices and associated active connections in the one or more congested areas, wherein determining the wireless communication devices comprises:
querying, via the interface, for the wireless communication devices;
receiving, via the interface, a list of international mobile subscriber identities (IMSIs) associated with the wireless communication devices; and
receiving, via the interface, a list of access point names (APNs) of the associated active connections corresponding the list of IMSIs;
identifying one or more network elements from a plurality of network elements configured to adjust a quality of service (QoS), the one or more identified network elements configured to adjust QoS for the one or more congested areas, respectively, wherein the one or more network elements configured to adjust QoS for the one or more congested areas are identified using the list of APNs, wherein the one or more elements comprise respective policy and charging rules function (PCRF) nodes; and
communicating, using the RCAF element, user plane congestion information to the one or more identified network elements serving the wireless communication devices.

8. The method of claim 7, wherein receiving and storing the event or report comprises:
receiving the event or report from a radio access network (RAN); and
storing the event or report for a predetermined period of time.

9. The method of claim 8, further comprising sending a request to the RAN for the event or report based on a configured time interval.

10. The method of claim 7, wherein receiving and storing the event or report comprises receiving the event or report from one or more network elements selected from a group comprising the O&M system, a access network discovery and selection function (ANDSF) server, a mobility management entity (MME), a serving gateway (S-GW), serving gateway general packet radio service (GPRS) support node (SGSN), a gateway GPRS support node (GGSN), and a packet data network (PDN) gateway (P-GW).

11. The method of claim 7, wherein determining the one or more MMES associated with the one or more congested areas comprises:
determining tracking area identities (TAIs) based fully qualified domain name (FQDN) for MME discovery; and
receiving, from the O&M system of a radio access network (RAN), a list of the TAIs supported by the one or more congested areas.

12. A server comprising:
a processor;
a storage device to store an indication from an operations and maintenance (O&M) system that demand for radio access network resources exceeds available capacity in an identified area of a wireless cellular network;
a radio access network (RAN) congestion awareness function (RCAF) comprising instructions that, when executed by the processor, manage congestion information for the wireless cellular network, the RCAF configured to:
establish a first interface between an RCAF element and the O&M system;
discover a mobility management entity (MME) serving the identified area of the wireless cellular network;
establish a second interface between the MME and the RCAF element;
request and receive, from the MME, a list of international mobile subscriber identities (IMSIs) associated with the identified area of the wireless cellular network;
receive, from the MME in response to the request for the list of IMSIs, a corresponding list of access point names (APNs) of active packet data network (PDN) connections;
discover a network node associated with the list of IMSIs from a plurality of network nodes configured to initiate an internet protocol connectivity access network (IP-CAN) session modification procedure;

establish a third interface between the RCAF element and the network node; and notify the network node configured to initiate the IP-CAN session modification procedure of the demand for radio access network resources.

13. The server of claim 12, wherein the RCAF is further configured to:

receive, from the O&M system, the indication that demand for radio access network resources exceeds available capacity.

14. The server of claim 13, wherein the RCAF is further configured to:

receive, from the O&M system, tracking area identity (TAI) supported by the identified area of the wireless cellular network; and use the TAI to discover the MME.

15. The server of claim 12, wherein the discovered network node associated with the list of IMSIs comprises a policy and charging rules function (PCRF) associated with the corresponding list of APNs.

16. The server of claim 12, wherein the RCAF is further configured to:

receive the indication that demand for radio access network resources exceeds available capacity through one or more interface selected from a group comprising a user plane interface, a control plane interface, and a network management plane interface.

17. A computer program product comprising a non-transitory computer-readable storage medium storing program code for causing one or more processors to perform a method, the method comprising:

storing an indication that demand for radio access network resources exceeds available capacity from an operations and maintenance (O&M) system in an identified area of a wireless cellular network; and performing a radio access network (RAN) congestion awareness function (RCAF) comprising:

establishing a first interface between an RCAF element and the O&M system;

receiving the indication that demand for radio access network resources exceeds available capacity;

receiving tracking area identity (TAI) supported by the identified area of the wireless cellular network;

discovering, using the TAI, a mobility management entity (MME) serving the identified area of the wireless cellular network;

establishing a second interface between the MME and the RCAF element;

requesting and receiving, from the MME, a list of international mobile subscriber identities (IMSIs) associated with the identified area of the wireless cellular network;

discovering a network node associated with the list of IMSIs from a plurality of network nodes configured to initiate an internet protocol connectivity access network (IP-CAN) session modification procedure;

establishing a third interface between the RCAF element and the network node; and notifying the network node configured to initiate the IP-CAN session modification procedure of the demand for radio access network resources.

18. The computer program product of claim 17, wherein performing the RCAF further comprises receiving, from the MME in response to the request for the list of IMSIs, a corresponding list of access point names (APNs) of active packet data network (PDN) connections.

19. The computer program product of claim 18, wherein the discovered network node associated with the list of IMSIs comprises a policy and charging rules function (PCRF) associated with the APNs.

20. The computer program product of claim 17, wherein performing the RCAF further comprises receiving the indication that demand for radio access network resources exceeds available capacity through one or more interface selected from a group comprising a user plane interface, a control plane interface, and a network management plane interface.

21. A computer program product comprising a non-transitory computer-readable storage medium storing program code for causing one or more processors to perform a method, the method comprising:

receiving, via a first interface between a radio access network (RAN) congestion awareness function (RCAF) element and the an operations and maintenance (O&M) system, radio access network (RAN) user plane congestion information (RUCI) from the O&M system;

processing the RUCI to determine a congestion level of a base station or a cell;

determining a mobility management entity (MME) serving an identified area of a wireless cellular network;

requesting and receiving a list of user equipment (UE) identifiers for UEs served by the base station or the cell from the MME over a second interface between the RCAF element and the MME;

receiving, in response to the request for the list of UE identifiers, a list of access point names (APNs) of an active packet data network (PDN) connections corresponding to the list of UE identifiers from the MME over the second interface;

discovering a policy and charging rules function (PCRF) associated with the list of UE identifiers from a plurality of PCRFs; and reporting the RUCI to the PCRF identified from the plurality of PCRFs as serving one of the PDN connections associated with the list of APNs for congestion mitigation over a third interface between the PCRF and the RCAF element.

22. The computer program product of claim 21, further comprising receiving a UE identifier, wherein the UE identifier comprises an international mobile subscriber identity (IMSI) corresponding to the UE served by the base station or the cell.

23. The computer program product of claim 21, wherein the RUCI includes one or more information element (IE) selected from a group comprising a first IE for a congested interface direction and node, a second IE for a congestion severity level, a third IE for a congestion situation indicating a change in whether or not congestion is detected, a fourth IE for congestion cell location information, a fifth IE for identifying a UE, a sixth IE for identifying a user associated with the UE, a seventh IE for identifying an APN, an eighth IE for packet data protocol (PDP) context information, and a ninth IE for an evolved packet system (EPS) bearer identifier.

24. The computer program product of claim 23, wherein the first IE for the congested interface direction and node includes at least one interface or node identifier selected from a group comprising a radio interface downlink identifier, a radio interface uplink identifier, a network interface downlink identifier, a network interface uplink identifier, a RAN node identifier.

25. The computer program product of claim 23, wherein the fifth IE for identifying the UE comprises an international mobile equipment identity (IMEI), and wherein the sixth IE for identifying a user associated with the UE comprises an international mobile subscriber identity (IMSI).

26. The computer program product of claim 21, wherein the method further comprises:
   storing the RUCI; and
   processing the stored RUCI to trigger the PCRF to modify an internet protocol connectivity access network (IP-CAN) session.

* * * * *